United States Patent
Zhang et al.

(10) Patent No.: US 12,368,858 B2
(45) Date of Patent: Jul. 22, 2025

(54) SIMPLIFIED DOWNSAMPLING FOR MATRIX BASED INTRA PREDICTION

(71) Applicant: Telefonaktiebolaget LM Ericsson (publ), Stockholm (SE)

(72) Inventors: Zhi Zhang, Solna (SE); Ruoyang Yu, Täby (SE); Kenneth Andersson, Gävle (SE); Per Wennersten, Årsta (SE); Jacob Ström, Stockholm (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/649,908

(22) Filed: Apr. 29, 2024

(65) Prior Publication Data

US 2024/0283939 A1    Aug. 22, 2024

Related U.S. Application Data

(63) Continuation of application No. 17/617,824, filed as application No. PCT/SE2020/050615 on Jun. 12, 2020, now Pat. No. 11,973,952.

(Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/59* (2014.11); *H04N 19/593* (2014.11)

(58) Field of Classification Search
None
See application file for complete search history.

(56) References Cited

U.S. PATENT DOCUMENTS

| | | |
|---|---|---|
| 11,277,637 B2 | 3/2022 | Van der Auwera et al. |
| 11,503,280 B2 | 11/2022 | Huo et al. |

(Continued)

FOREIGN PATENT DOCUMENTS

| | | |
|---|---|---|
| CN | 114073082 A | 2/2022 |
| CO | 2021004169 A2 | 4/2021 |

(Continued)

OTHER PUBLICATIONS

Bross, B. et al., "Versatile Video Coding (Draft 5)", Joint Video Experts Team (JVET) of ITU-T SG 16 WP 3 and ISO/IEC JTC 1/SC 29/WG 11, 14th Meeting, Mar. 19-27, 2019, pp. 1-379, Geneva, CH, Document JVET-N1001-v6.

(Continued)

*Primary Examiner* — Talha M Nawaz
(74) *Attorney, Agent, or Firm* — COATS & BENNETT, PLLC

(57) ABSTRACT

A prediction unit for an encoder or decoder implements matrix based intra prediction. Input boundary samples for a current block are downsampled to obtain reduced boundary samples for matrix multiplication and/or linear interpolation, or both. In one embodiment, downsampling is performed in a manner that aligns the reduced boundary samples with an output of a matrix multiplication unit of the prediction unit. In other embodiments, downsampling is performed without averaging. The embodiments reduce the complexity of the prediction unit and the latency of the encoder or decoder.

18 Claims, 26 Drawing Sheets

Related U.S. Application Data

(60) Provisional application No. 62/861,546, filed on Jun. 14, 2019.

(51) Int. Cl.
  *H04N 19/176* (2014.01)
  *H04N 19/59* (2014.01)
  *H04N 19/593* (2014.01)

(56) References Cited

U.S. PATENT DOCUMENTS

| | | | |
|---|---|---|---|
| 11,659,185 | B2 | 5/2023 | Deng et al. |
| 2011/0280304 | A1 | 11/2011 | Jeon et al. |
| 2014/0056352 | A1 | 2/2014 | Park et al. |
| 2017/0251222 | A1 | 8/2017 | Ye et al. |
| 2018/0184083 | A1* | 6/2018 | Panusopone ......... H04N 19/107 |
| 2018/0184103 | A1* | 6/2018 | Panusopone ......... H04N 19/593 |
| 2019/0200044 | A1 | 6/2019 | Galpin et al. |
| 2020/0112741 | A1 | 4/2020 | Han et al. |
| 2020/0344468 | A1 | 10/2020 | Lin et al. |
| 2020/0359050 | A1 | 11/2020 | Van der Auwera et al. |
| 2020/0396452 | A1 | 12/2020 | Hu et al. |
| 2021/0203941 | A1 | 7/2021 | Huo et al. |
| 2021/0218960 | A1 | 7/2021 | Pfaff et al. |
| 2022/0060745 | A1* | 2/2022 | Deng ..................... H04N 19/11 |
| 2022/0078434 | A1 | 3/2022 | Salehifar et al. |
| 2022/0385922 | A1* | 12/2022 | Galpin ................. H04N 19/176 |

FOREIGN PATENT DOCUMENTS

| | | | |
|---|---|---|---|
| CO | 2021016628 | A2 | 1/2022 |
| EP | 3955574 | A1 | 2/2022 |
| WO | 2020227405 | A1 | 11/2020 |

OTHER PUBLICATIONS

Zhang, Z. et al., "Non-CE3 Simplification on MIP boundary sample downsampling process", Joint Video Experts Team (JVET) of ITU-T SG16 WP3 and ISO/IEC JTC1/SC29/WG11, 15th Meeting, Jul. 3-12, 2019, pp. 1-9, Gothenburg, SE, Document: JVET-O0161.

Pfaff, J. et al., "CE3: Affine linear weighted intra prediction (CE3-4.1, CE3-4.2)", Joint Video Experts Team (JVET) of ITU-T SG16 WP3 and ISO/IEC JTC1/SC29/WG11 14th Meeting, Mar. 19-27, 2019, pp. 1-17, Geneva, CH, Document: JVET-N0217.

Lee, J. et al., "Non-CE3: Modification of PDPC", Joint Video Experts Team (JVET) of ITU-T SG 16 WP 3 and ISO/IEC JTC 1/SC 29/WG 11, 13th Meeting, Jan. 9-18, 2019, pp. 1-5, Marrakech, MA, Document JVET-M0238-v2.

Pfaff, J. et al., "CE3: Affine linear weighted intra prediction (test 1.2.1, test 1.2.2)", Joint Video Experts Team (JVET) of ITU-T SG 16 WP 3 and ISO/IEC JTC 1/SC 29/WG 11, 13th Meeting, Jan. 9-18, 2019, pp. 1-11, Marrakech, MA, Document JVET-M0043.

Bross, B. et al., "Versatile Video Coding (Draft 5)", Joint Video Experts Team (JVET) of ITU-T SG 16 WP3 and ISO/IEC JTC 1/SC 29/WG 11, 14th Meeting, Geneva, CH, Mar. 19-27, 2019, pp. 1-400, Document: JVET-N1001-v8.

Chen, J. et al., "Algorithm description for Versatile Video Coding and Test Model (VTM 5)", Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-76, Document: JVET-N1002-v2.

De Luxan Hernandez, S., et al., "CE3 Line-based intra coding mode (Tests 2.1.1 and 2.1.2)", Joint Video Experts Team (JVET) of ITU-T SG 16 WP 3 and ISO/IEC JTC 1/SC 29/WG 11, 12th Meeting: Macao, CN, Oct. 3-12, 2018, pp. 1-9, Document: JVET-L0076-v2.

\* cited by examiner

SIMPLIFIED DOWNSAMPLING FOR MATRIX BASED INTRA PREDICTION

The present application is a continuation of U.S. patent application Ser. No. 17/617,824, which was filed on Dec. 9, 2021, which is a national stage application of PCT/SE2020/050615, which was filed Jun. 12, 2020, and claims benefit of U.S. Provisional Application No. 62/861,546, which was filed on Jun. 14, 2019, the disclosures of each of which are incorporated herein by reference in their entirety.

TECHNICAL FIELD

The present disclosure relates generally to block based video coding and, more particularly, to reduced complexity matrix based intra prediction used in block based video coding.

BACKGROUND

High Efficiency Video Coding (HEVC) is a block-based video codec standardized by International Telecommunication Union-Telecommunication (ITU-T) and the Moving Pictures Expert Group (MPEG) that utilizes both temporal and spatial prediction. Spatial prediction is achieved using intra (I) prediction from within the current picture. Temporal prediction is achieved using uni-directional (P) or bi-directional (B) inter prediction on a block level from previously decoded reference pictures. In the encoder, the difference between the original pixel data and the predicted pixel data, referred to as the residual, is transformed into the frequency domain, quantized and then entropy coded before transmission together with necessary prediction parameters such as prediction mode and motion vectors, which are also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of the video codec under development is Versatile Video Coding (VVC). At the time of this filing, the current version of the VVC draft specification was "Versatile Video Coding (Draft 5)", JVET-N1001-v3.

Matrix based intra prediction is a coding tool that is included in the current version of the VVC draft. For predicting the samples of a current block of width W and height H, matrix based intra prediction (MIP) takes one column of H reconstructed neighboring boundary samples to the left of the current block and one row of W reconstructed neighboring samples above the current block as input. The predicted samples are derived by downsampling the original boundary samples to obtain a set of reduced boundary samples, matrix multiplication of the reduced boundary samples to obtain a subset of the prediction samples in the prediction block, and linear interpolation to obtain the remaining prediction samples in the prediction block.

The reduced boundary samples are derived by averaging samples from original boundaries. The process to derive the averages requires addition and shift operations which increase the decoder and encoder computational complexity and latency, especially for hardware implementations. In the current version of VVC, the maximum dimension of a block which is predicted by MIP is 64×64. To derive one sample of the reduced boundary, the maximum number of original samples used in the average operation is 64/4=16. The computational complexity for this average operation is 16 additions and 1 shift.

Further, when the matrix multiplication produces a reduced prediction block comprising a subset of the prediction samples in the final prediction block, linear interpolation is used to obtain the remaining prediction samples. In this case, an intermediate reduced boundary is used for interpolating the prediction samples in the first row and/or column of the prediction block. In this case, the reduced boundary samples for the top and/or left boundaries are derived from the intermediate reduced boundary. This two-step derivation process for the reduced boundary increases the encoder and decoder latency.

Another drawback to using MIP is that the boundary samples in the reduced boundary used as input for the matrix multiplication unit (MMU) do not align with the MMU output. The process for averaging the boundary samples yields values centered between two original boundary samples and biased towards certain ones of the MIP outputs. A similar problem also exists for boundary samples used for linear interpolation.

SUMMARY

A prediction unit for an encoder or decoder implements MIP for encoding or decoding video or still images. Input boundary samples for a current block are downsampled to obtain reduced boundary samples for matrix multiplication and/or linear interpolation, or both. In one embodiment, downsampling is performed in a manner that aligns the reduced boundary samples with an output of a matrix multiplication unit of the prediction unit. In other embodiments, downsampling is performed by selecting a sample from the input boundary samples without averaging that aligns the reduced boundary samples with an output of a matrix multiplication unit of the prediction unit to reduce the complexity and latency of the prediction unit in the encoder or decoder.

One aspect of the present disclosure is to provide techniques that enable alignment of reduced boundary samples used for either matrix multiplication or interpolation with the output of the MMU in the prediction while maintaining coding efficiency. Various techniques are described for downsampling a set of input boundary samples to produce a set of reduced boundary samples that are aligned with the MMU output in at least one direction. In one embodiment, the reduced boundary samples are derived by downsampling input boundary samples using a filter that is centered on an output of the MMU in either a vertical or horizontal direction, or by averaging boundary samples centered on an output of the MMU. In other embodiments, the reduced boundary samples are derived without averaging by selecting the input boundary samples that are aligned with corresponding outputs of the MMU. In some embodiments, one set of the reduced boundary samples, generated with or without averaging, can be used as input to the MMU and a second, different set of reduced boundary samples, generated with or without averaging, can be used for linear interpolation.

Another aspect of the disclosure is to reduce the computational complexity for derived the reduced boundary samples by reducing the number of original boundary samples used to derive one reduced boundary sample. Reduction of computational complexity is achieved in some embodiments by reducing the number of input boundary samples that are averaged to generate one reduced boundary sample. For example, the worst case requires reading and averaging 16 input boundary samples to derive one reduced boundary sample. This process requires 16 reads, 15 additions (n−1) and 1 shift. In this example, computational complexity can be reduced by selecting two of the sixteen boundary samples for averaging, which requires two reads, 1 addition and 1 shift. In another embodiment, reduction of computational complexity is achieved by downsampling without averaging. Continuing with the same example, the MIP can be configured to select one of the sixteen original input boundary samples. In this case, only 1 read is required with no addition or shift operations.

Another aspect of the disclosure is to reduce latency by avoiding two step derivation process for the reduced boundary samples used as input to the MMU. When the matrix multiplication produces a reduced prediction block comprising a subset of the prediction samples in the final prediction block, linear interpolation is used to obtain the remaining prediction samples. In this case, an intermediate reduced boundary is used for interpolating the prediction samples between the first row or column of the reduced prediction block and the top or left boundary respectively. The reduced boundary samples for the top and/or left boundaries are derived from the intermediate reduced boundary. This two-step derivation process for the reduced boundary increases the encoder and decoder latency. In embodiments of the present disclosure, the reduced boundary samples used for matrix multiplication and interpolation respectively are derived in parallel in a single step.

One aspect of the present disclosure comprises methods implemented by an encoder or decoder of matrix based intra-prediction. The method comprises downsampling a set of input boundary samples to generate a set of reduced boundary samples and generating a reduced prediction block by multiplication of the reduced boundary samples in a multiplication unit. The reduced prediction block comprises a subset of prediction samples in a prediction block. The method further comprises generating a set of interpolation boundary samples aligned with respective outputs of the multiplication unit. The method further comprises generating one or more remaining prediction samples of the prediction block by linear interpolation using one or more boundary samples in the set of interpolation boundary samples and the reduced set of prediction samples.

Another aspect of the present disclosure comprises an encoder or decoder configured to perform matrix based intra-prediction. The encoder/decoder is configured to downsample a set of input boundary samples to generate a set of reduced boundary samples and generating a reduced prediction block by multiplication of the reduced boundary samples in a multiplication unit. The reduced prediction block comprises a subset of prediction samples in a prediction block. The encoder/decoder is further configured to generate a set of interpolation boundary samples aligned with respective outputs of the multiplication unit. The encoder/decoder is further configured to generate one or more remaining prediction samples of the prediction block by linear interpolation using one or more boundary samples in the set of interpolation boundary samples and the reduced set of prediction samples.

Another aspect of the present disclosure comprises an encoder or decoder configured to perform matrix based intra-prediction. The encoder/decoder comprises a downsampling unit and a block prediction unit. The downsampling unit is configured to downsample a set of input boundary samples for a current block in an image to generate 1) a set of reduced boundary sample for input to a multiplication unit, and 2) a set of interpolation boundary samples aligned with respective outputs of the multiplication unit. The block prediction unit comprises the multiplication unit configured to multiply the reduced boundary samples to generate a subset of prediction samples in a prediction block; and an interpolation unit configured to generate one or more of the remaining prediction samples by linear interpolation using one or more boundary samples in the set of interpolation boundary samples and the reduced set of prediction samples from the matrix multiplication unit.

Another aspect of the present disclosure comprise an encoder or decoder configured to perform matrix based intra-prediction. The encoder/decoder comprises interface circuitry configured to enable input and/or output of video signals and/or image signals and processing circuitry. The processing circuitry is configured to downsample a set of input boundary samples to generate a set of reduced boundary samples and to generate a reduced prediction block by multiplication of the reduced boundary samples in a multiplication unit. The reduced prediction block comprises a subset of prediction samples in a prediction block. The processing circuitry is further configured to generate a set of interpolation boundary samples aligned with respective outputs of the multiplication unit. The processing circuitry is further configured to generate one or more remaining prediction samples of the prediction block by linear interpolation using one or more boundary samples in the set of interpolation boundary samples and the reduced set of prediction samples.

Another aspect of the present disclosure comprise a source device or destination device comprising an encoder and/or decoder according to any one of the preceding three paragraphs.

Yet another aspect of the disclosure comprises a computer program for an encoder or decoder configured to perform matrix based intra-prediction. The computer program comprises executable instructions that, when executed by processing circuitry in the encoder/decoder causes the encoder/decoder to downsample a set of input boundary samples to generate a set of reduced boundary samples and generating a reduced prediction block by multiplication of the reduced boundary samples in a multiplication unit. The reduced prediction block comprises a subset of prediction samples in a prediction block. The instructions further cause the encoder/decoder to generate a set of interpolation boundary samples aligned with respective outputs of the multiplication unit. The instructions further cause the encoder/decoder to generate one or more remaining prediction samples of the prediction block by linear interpolation using one or more boundary samples in the set of interpolation boundary samples and the reduced set of prediction samples.

Another aspect of the disclosure comprises a carrier containing a computer program according to the preceding paragraph. The carrier is one of an electronic signal, optical signal, radio signal, or a non-transitory computer readable storage medium.

DETAILED DESCRIPTION

This application claims priority to U.S. Application No. 62/861,546 filed 14 Jun. 2019, disclosure of which is incorporated in its entirety by reference herein.

Figure 1:
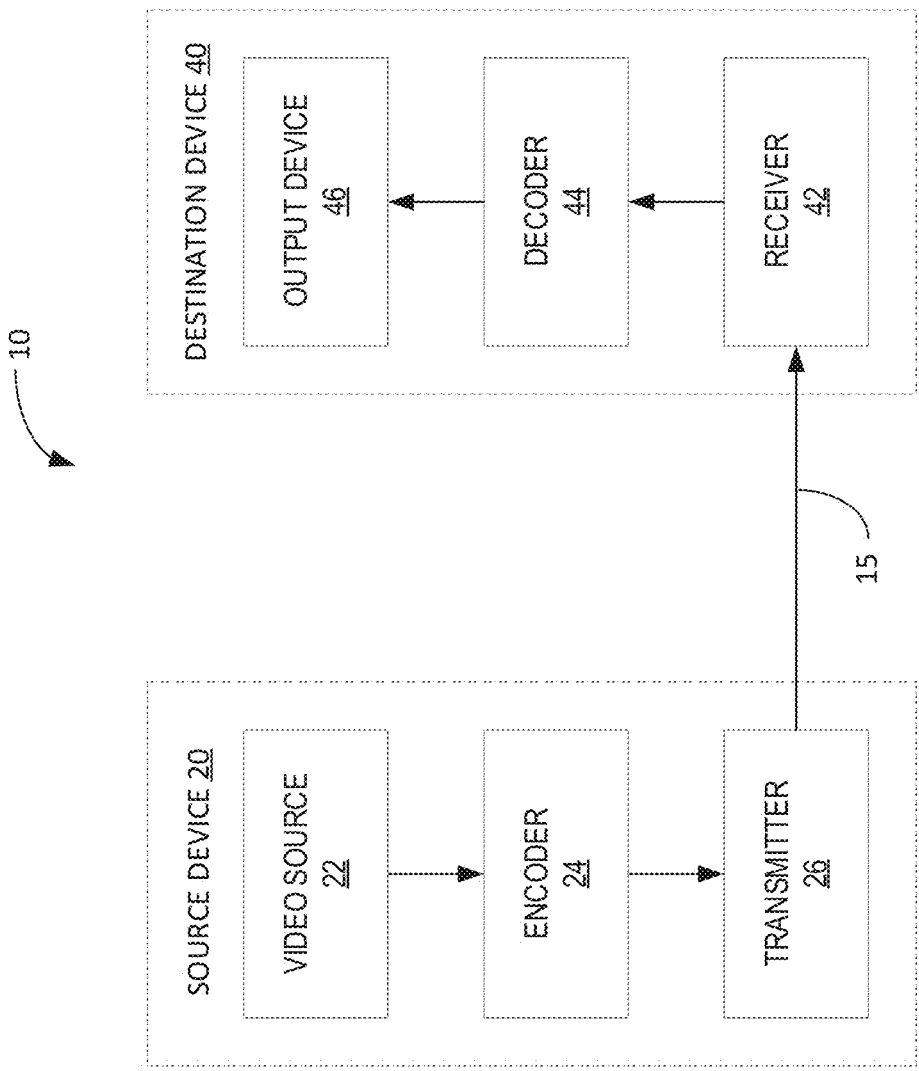
FIG. 1 illustrates an exemplary video transmission system using MIP as herein described.

The present disclosure will be explained in the context of a video transmission system 10 as shown in FIG. 1. Those skilled in the art will appreciate that the video transmission system 10 in FIG. 1 is used herein for purposes of explaining the principles of the present disclosure and that the techniques herein are not limited to the video transmission system 10 of FIG. 1, but are more generally applicable to any block based video transmission system using matrix based intra prediction (MIP).

The video transmission system 10 includes a source device 20 and destination device 40. The source device 20 generates coded video for transmission to the destination device 40. The destination device 40 receives the coded video from the source device 20, decodes the coded video to obtain an output video signal, and displays or stores the output video signal.

The source device 20 includes an image source 22, encoder 24, and transmitter 26. Image source 22 may, for example, comprise a video capture device, such as a video camera, playback device or a video storage device. In other embodiments, the image source 22 may comprise a computer or processing circuitry configured to produce computer-generated video. The encoder 24 receives the video signal from the video source 22 and generates an encoded video signal for transmission. The encoder 24 is configured to generate one or more coded blocks as hereinafter described. The encoder 24 is shown in More detail in FIG. 2. To encode a current block, the encoder 24 uses boundary samples from neighboring blocks stored in memory 38. The transmitter 26 is configured to transmit the coded blocks as a video signal to the destination device 30 over a wired or wireless channel 15. In one embodiment, the transmitter 26 comprises part of a wireless transceiver configured to operate according to the Long Term Evolution (LTE) or New Radio (NR) standards.

The destination device 40 comprises a receiver 42, decoder 44, and output device 46. The receiver 42 is configured to receive the coded blocks in a video signal transmitted by the source device 20 over a wired or wireless channel 15. In one embodiment, the receiver 42 is part of a wireless transceiver configured to operate according to the LTE or NR standards. The encoded video signal is input to the decoder 44, which is configured to implement MIP to decode one or more coded blocks contained within the encoded video signal to generate an output video that reproduces the original video encoded by the source device 20. The decoder 44 is shown in more detail in FIG. 3. To decode a current block, the decoder 44 uses boundary samples from neighboring blocks stored in memory 58. The output video is output to the output device 26. The output device may comprise, for example, a display, printer or other device for reproducing the video, or data storage device.

Figure 2:
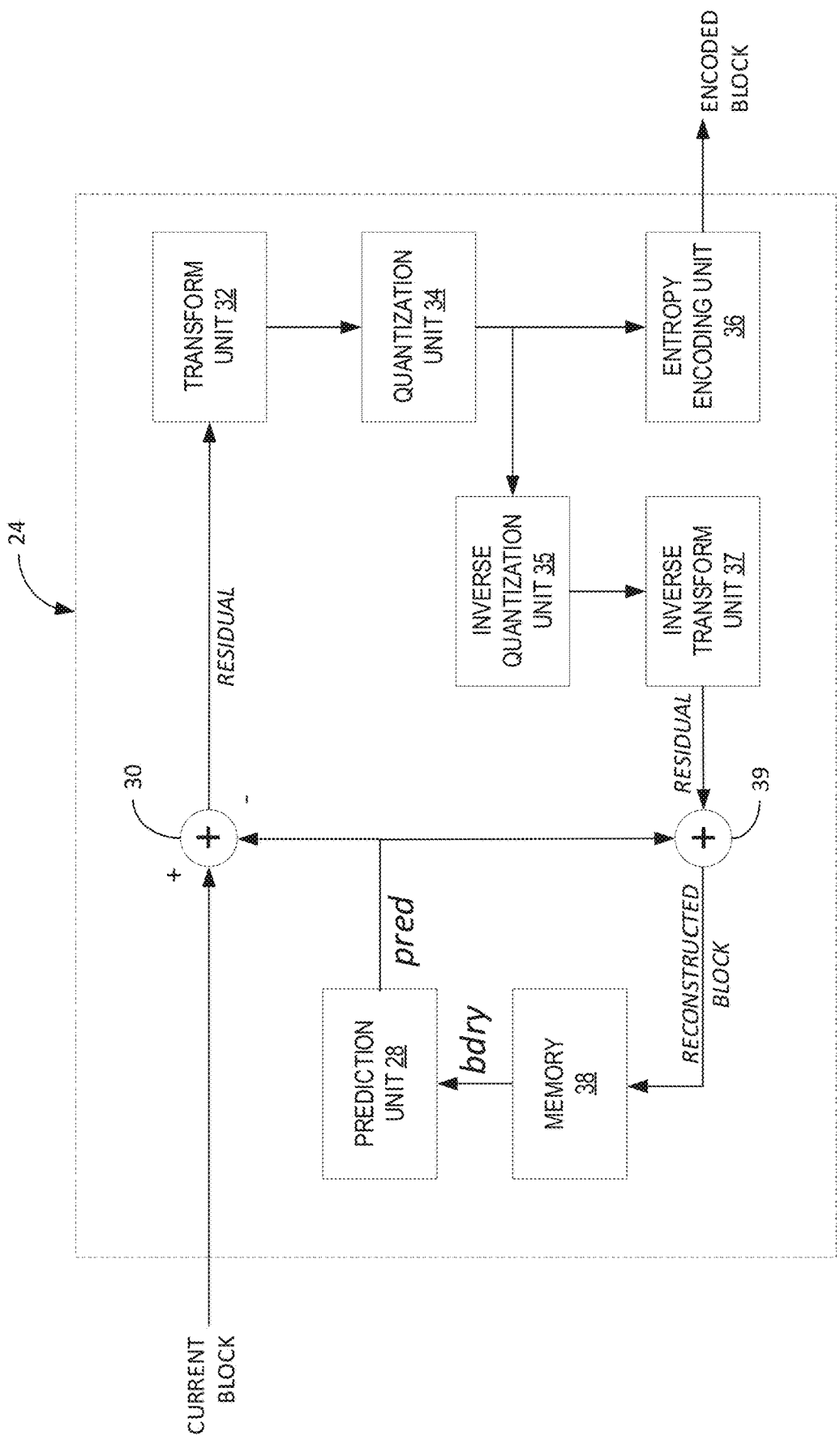
FIG. 2 illustrates an exemplary encoder configured to implement MIP as herein described.

FIG. 2 illustrates an exemplary encoder 24 according to an embodiment. Encoder 24 comprises processing circuitry configured to perform MIP. The main functional components of the encoder 24 include a prediction unit 28, subtracting unit 30, transform unit 32, quantization unit 34, entropy encoding unit 36, an inverse quantization unit 35, an inverse transform unit 37, and a summing unit 39. The components of the encoder 24 can be implemented by hardware circuits, microprocessors, or a combination thereof. In operation, a current block is input to the subtraction unit 30, which subtracts a prediction block output by the prediction unit 28 from the current block to obtain the residual block. The residual block is transformed to a frequency domain by the transform unit 32 to obtain a two-dimensional block of frequency domain residual coefficients. The frequency domain residual coefficients are then quantized by the quantization unit 34 and entropy encoded by the entropy encoding unit 36 to generate the encoded video block. The quantized residual coefficients are also input to the inverse quantization unit 35, which de-quantizes to reconstruct the frequency domain residual coefficients. The reconstructed frequency domain residual coefficients are then transformed back to the time domain by inverse transform unit 37 and added to the prediction block output by the prediction unit 28 by the summing unit 39 to obtain a reconstructed block that is stored in memory 38. The reconstructed blocks stored in memory 38 provide the input boundary samples used by the prediction unit 28 for MIP.

Figure 3:
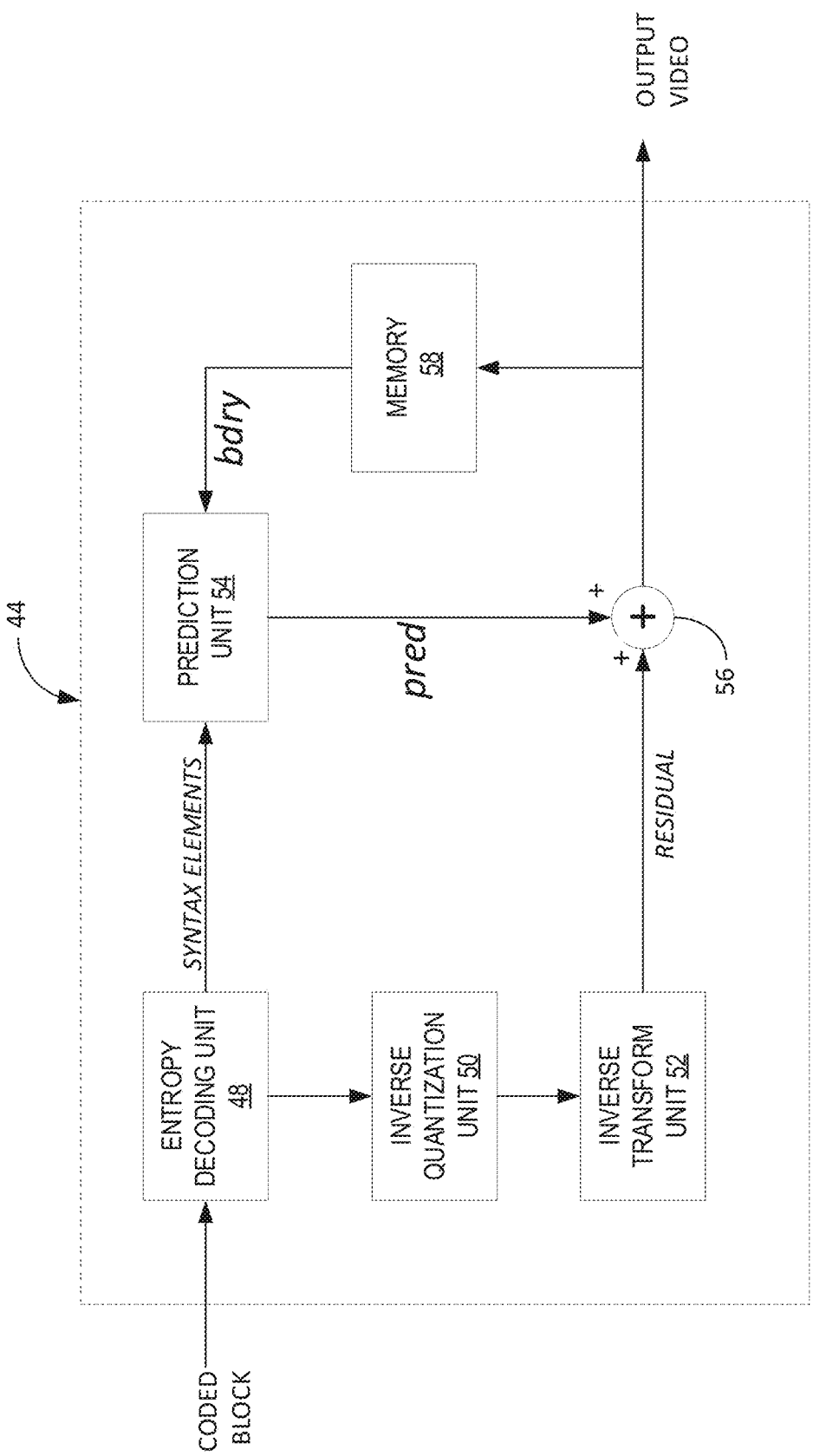
FIG. 3 illustrates an exemplary decoder configured to implement MIP as herein described.

FIG. 3 illustrates an exemplary decoder 44 configured to perform intra prediction as herein described. The decoder 44 includes an entropy decoding unit 48, inverse quantization unit 50, inverse transform unit 52, prediction unit 54, and summing unit 56. The entropy decoding unit 48 decodes a current block to obtain a two-dimensional block of quantized residual coefficients and provides syntax information to the prediction unit 54. The inverse quantization unit 50 performs inverse quantization to obtain de-quantized residual coefficients and the inverse transform unit 52 performs an inverse transformation of the de-quantized residual coefficients to obtain an estimate of the transmitted residual coefficients. The prediction unit 54 performs intra prediction as herein described to generate a prediction block for the current block. The summing unit 56 adds the prediction block from the prediction unit 54 and the residual values output by the inverse transform unit 52 to obtain the output video.

The encoder 24 or decoder 44 are each configured to perform intra prediction to encode and decode video. A video sequence comprises a series of pictures where each picture comprises one or more components. Each component can be described as a two-dimensional rectangular array of sample values. It is common that a picture in a video sequence comprises three components; one luma component Y where the sample values are luma values, and two chroma components Cb and Cr, where the sample values are chroma values. It is common that the dimensions of the chroma components are smaller than the luma components by a factor of two in each dimension. For example, the size of the luma component of a High Definition (HD) picture can be 1920×1080 and the chroma components can have the dimension of 960×540. Components are sometimes referred to as color components. In the following methods and apparatus useful for the encoding and decoding of video sequences are described. However, it should be understood that the techniques described can also be used for encoding and decoding of still images.

HEVC and Versatile Video Coding (VVC) are examples of block based video coding techniques. A block is a two-dimensional array of samples. In video coding, each component is split into blocks and the coded video bitstream is a series of blocks. It is common in video coding that the picture is split into units that cover a specific area. Each unit comprises all blocks that make up that specific area and each block belongs fully to only one unit. The coding unit (CU) in HEVC and VVC is an example of such a unit. A coding tree unit (CTU) is a logical unit which can be split into several CUs. In HEVC, CUs are squares, i.e., they have a size of N×N luma samples, where N can have a value of 64, 32, 16 or 8. In the current H.266 test model Versatile Video Coding (VVC), CUs can also be rectangular, i.e., have a size of N×M luma samples where N is different from M.

Spatial and temporal prediction can be used to eliminate redundancy in the coded video sequence. Intra prediction predicts blocks in a picture based on spatial extrapolation of samples from previously decoded blocks of the same (current) picture. Intra prediction can also be used in video compression, i.e., compression of still videos where there is only one picture to compress/decompress. Inter prediction predicts blocks by using samples for previously decoded pictures. This disclosure relates to intra prediction.

Intra directional prediction is utilized in HEVC and VVC. In HEVC, there are 33 angular modes and 35 modes in total. In VVC, there are 65 angular modes and 67 modes in total. The remaining two modes, "planar" and "DC" are non-angular modes. Mode index 0 is used for the planar mode, and mode index 1 is used for the DC mode. The angular prediction mode indices range from 2 to 34 for HEVC and from 2 to 66 for VVC. Intra directional prediction is used for all components in the video sequence, i.e. luma component Y, chroma components Cb and Cr.

In exemplary embodiments of the disclosure, the prediction unit 28, 54 at the encoder 24 or decoder 44 respectively is configured to implement MIP to predict samples of the current block. MIP is a coding tool that is included in the current version of the VVC draft. For predicting the samples of a current block of width W and height H, MIP takes one column of H reconstructed neighboring boundary samples to the left of the current block and one row of W reconstructed neighboring samples above the current block as input. The predicted samples are derived as follows:

- For each boundary ($bdry_{top}$ and $bdry_{left}$), reduced boundary samples are extracted by averaging the input boundary samples depending on the current block dimension. The extracted averaged boundary samples are denoted as the reduced boundary $bdry_{red}$.
- A matrix vector multiplication is carried out with the extracted averaged boundary samples as input. The output is a reduced prediction signal consisting of a set of predicted sample values where each predicted sample corresponds to a position in the current block, and where the set of positions is a subset of all positions of the current block. The output reduced prediction signal is named as $pred_{red}$.
- The prediction sample values for the remaining positions in the current block that is not in the set of positions are generated from the reduced prediction signal by linear interpolation which is a single step linear interpolation in each direction (vertical and horizontal). The prediction signal comprises all prediction sample values for the block.
  - If H>W, the horizontal linear interpolation is first applied using the reduced left boundary samples which are named as $bdryred_{left}$ or $bdry_{redII}^{left}$ depending on the current block dimension. A vertical linear interpolation is applied after horizontal linear interpolation using the original top boundary $bdry_{top}$.
  - If H≤W, the vertical linear interpolation is first applied using the reduced top boundary samples which are named as $bdry_{red}^{top}$ or $bdry_{redII}^{top}$ depending on the current block dimension. A horizontal linear interpolation is applied after vertical linear interpolation using the original left boundary $bdry_{left}$.
- The predicted samples are finally derived by clipping on each samples of the prediction signal. In some embodiments, the samples of reduced prediction block can be clipped prior to interpolation.

Figure 4:
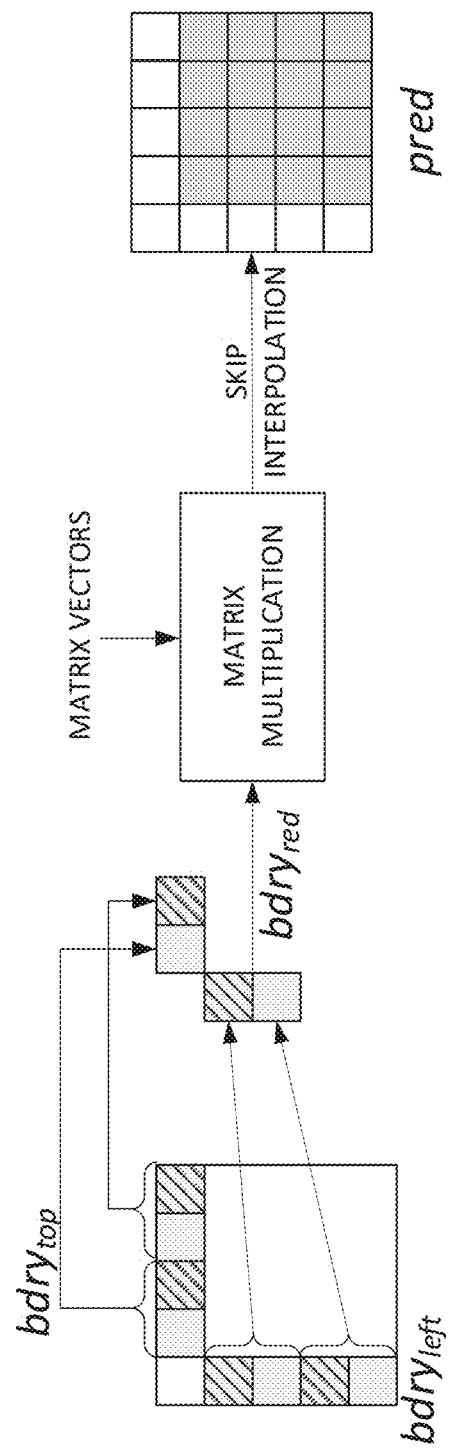
FIG. 4 illustrates MIP for a 4×4 prediction block.

FIG. 4 illustrates an example of MIP for a 4×4 block. Given a 4×4 block, the $bdry_{red}$ contains 4 samples which are derived from averaging every two samples of each boundary. The dimension of $pred_{red}$ is 4×4, which is same as the current block. Therefore, the horizontal and vertical linear interpolation can be skipped.

Figure 5:
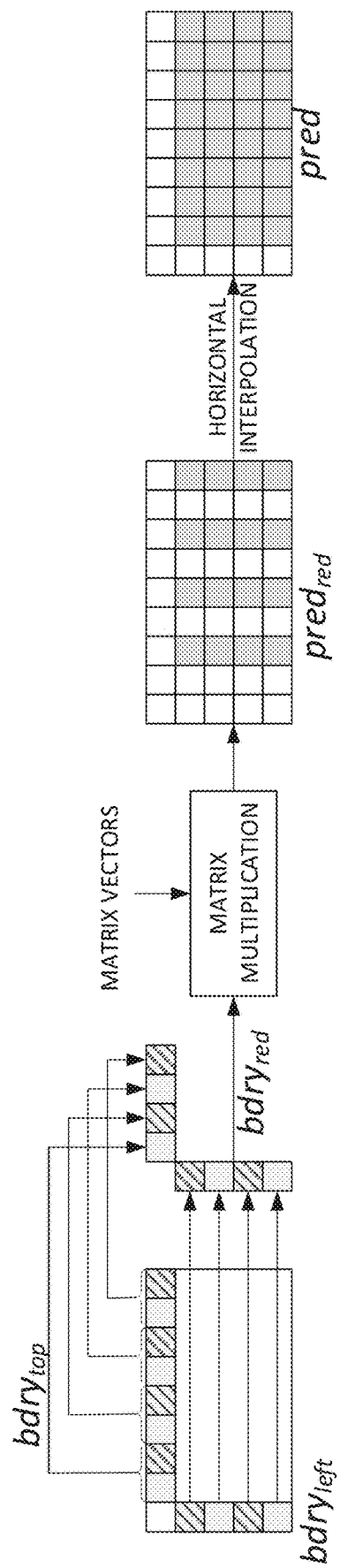
FIG. 5 illustrates MIP for a 8×4 prediction block.

FIG. 5 illustrates an example of MIP for an 8×4 block. Given an 8×4 block, the $bdry_{red}$ contains 8 samples which are derived from the original left boundary and averaging every two samples of the top boundary. The dimension of $pred_{red}$ is 4×4. The prediction signal at the remaining positions is generated from horizontal linear interpolation using the original left boundary $bdry_{left}$.

Given a W×4 block, where W≥16, the $bdry_{red}$ contains 8 samples which are derived from the original left boundary and averaging every W/4 samples of the top boundary. The dimension of $pred_{red}$ is 8×4. The prediction signal at the remaining positions is generated by performing horizontal linear interpolation using the original left boundary $bdry_{left}$.

Given a 4×8 block, the bdry$_{red}$ contains 8 samples which are derived from averaging every two samples of the left boundary and the original top boundary. The dimension of pred$_{red}$ is 4×4. The prediction signal at the remaining positions is generated by performing vertical linear interpolation using the original top boundary bdry$_{top}$.

Figure 6:
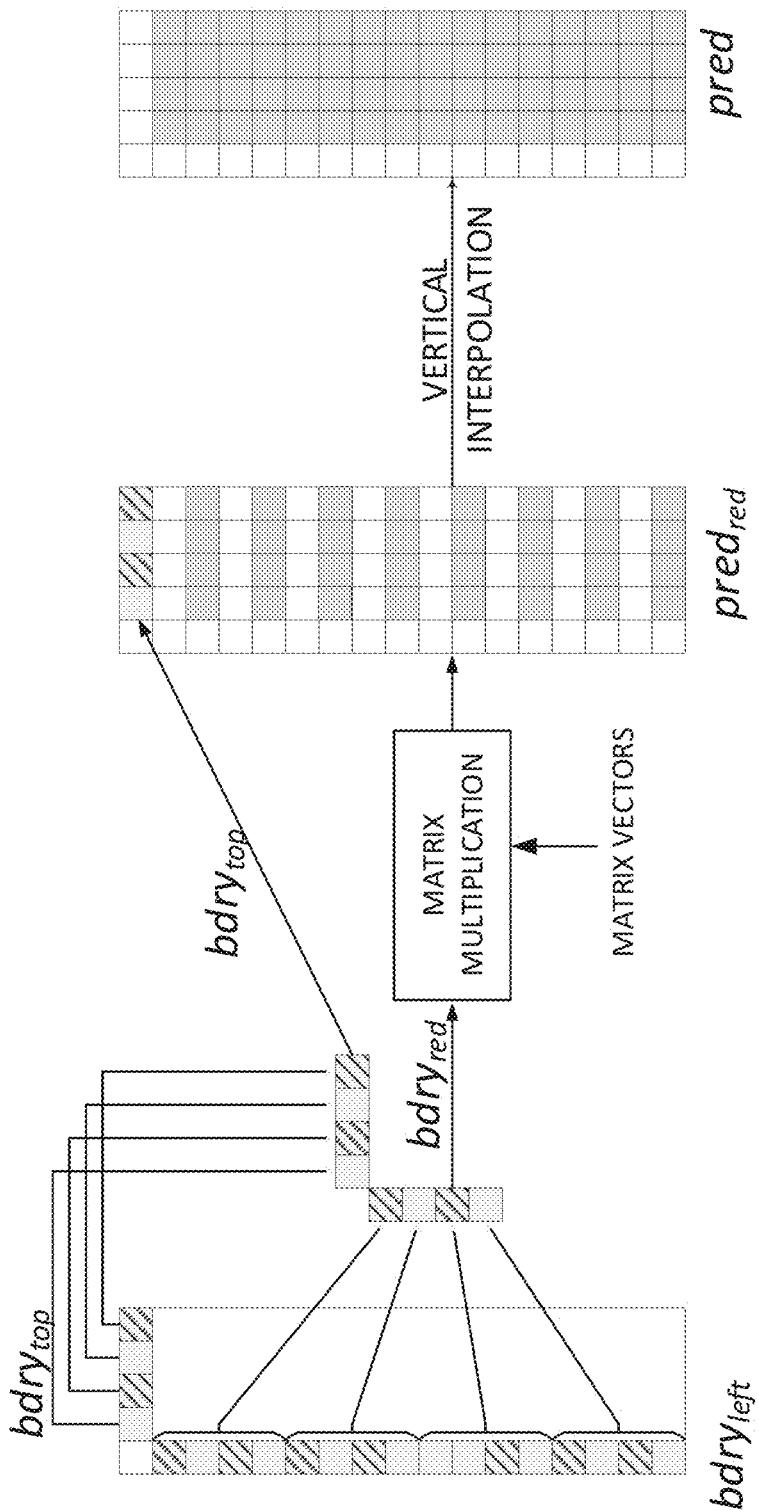
FIG. 6 illustrates MIP for a 4×16 prediction block.

Given a 4×H block, where H≥16, the bdry$_{red}$ contains 8 samples which are derived from averaging every H/4 samples of the left boundary and the original top boundary. The dimension of pred$_{red}$ is 4×8. The prediction signal at the remaining positions is generated by performing vertical linear interpolation using the original top boundary bdry$_{top}$. FIG. 6 shows an example of MIP process for a 4×16 block.

Figure 7:
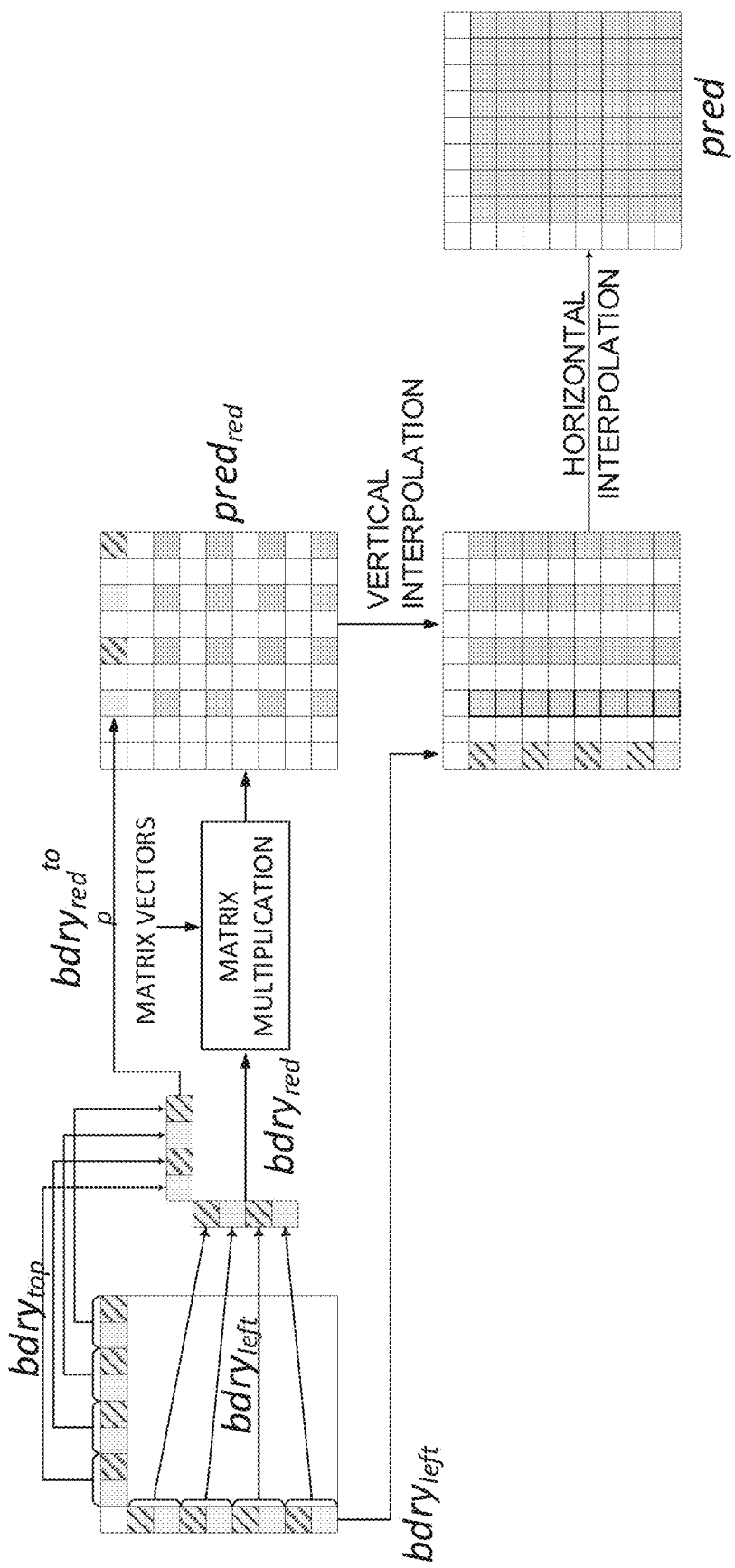
FIG. 7 illustrates MIP for an 8×8 prediction block.

Given an 8×8 block, the bdry$_{red}$ contains 8 samples which are derived from averaging every two samples of each boundary. The dimension of pred$_{red}$ is 4×4. The prediction signal at the remaining positions is generated by first performing vertical linear interpolation using the reduced top boundary bdry$_{redII}^{top}$, and secondly performing horizontal linear interpolation using the original left boundary bdry$_{left}$. FIG. 7 shows an example of the MIP process for an 8×8 block.

Figure 8:
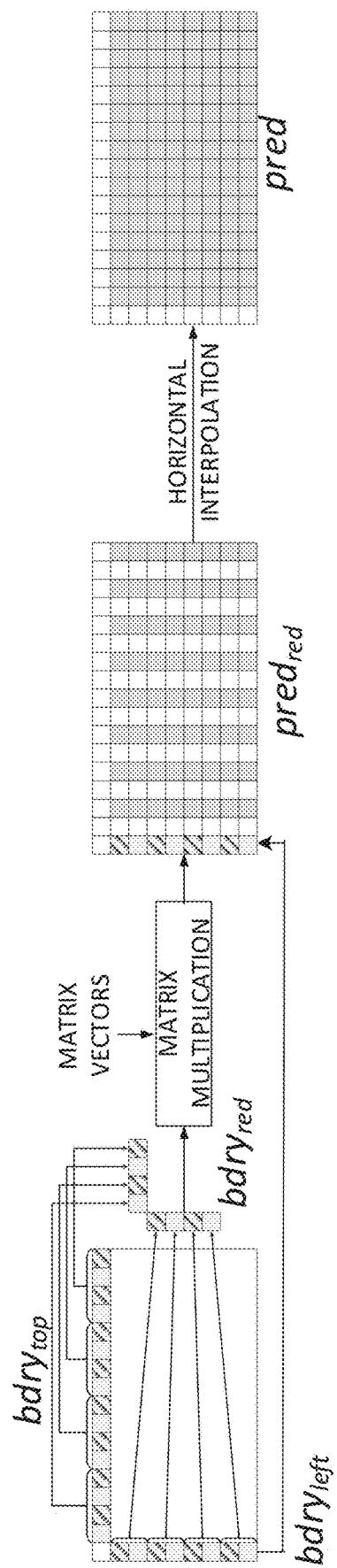
FIG. 8 illustrates MIP for a 16×8 prediction block.

Given a W×8 block, where W≥16, the bdry$_{red}$ contains 8 samples which are derived from averaging every two samples of left boundary and averaging every W/4 samples of top boundary. The dimension of pred$_{red}$ is 8×8. The prediction signal at the remaining positions is generated by performing horizontal linear interpolation using the original left boundary bdry$_{left}$. FIG. 8 shows an example of MIP process for a 16×8 block.

Given an 8×H block, where H≥16, the bdry$_{red}$ contains 8 samples which are derived from averaging every H/4 samples of the left boundary and averaging every two samples of the top boundary. The dimension of pred$_{red}$ is 8×8. The prediction signal at the remaining positions is generated by performing vertical linear interpolation using the original top boundary bdry$_{top}$.

Given a W×H block, where W≥16 and H≥16, the bdry$_{red}$ contains 8 samples which are derived as follows:
For H≤W, first, bdry$_{redII}^{top}$ contains 8 samples that are derived by averaging every W/8 samples of top boundary. Secondly, bdry$_{red}$ contains 8 samples are derived from averaging every H/4 samples of the left boundary and averaging every two samples of the bdry$_{redII}^{top}$.
For H>W, first bdry$_{redII}^{left}$ contains 8 samples are derived by averaging every H/8 samples of left boundary. Secondly, the bdry$_{red}$ contains 8 samples are derived from averaging every two of the bdry$_{redII}^{left}$ and every W/4 samples of the top boundary.

The dimension of pred$_{red}$ is 8×8. The prediction signal at the remaining positions is generated using linear interpolation as follows:
For H≤W, first the vertical linear interpolation using the reduced top boundary samples bdry$_{redII}^{top}$, which are derived by averaging every W/8 samples of top boundary, secondly the horizontal linear interpolation using the original left boundary bdry$_{left}$.
For H>W, first the horizontal linear interpolation using the reduced left boundary samples bdry$_{redII}^{left}$, which are derived by averaging every H/8 samples of top boundary, secondly the vertical linear interpolation using the original top boundary bdry$_{top}$.

Figure 9:
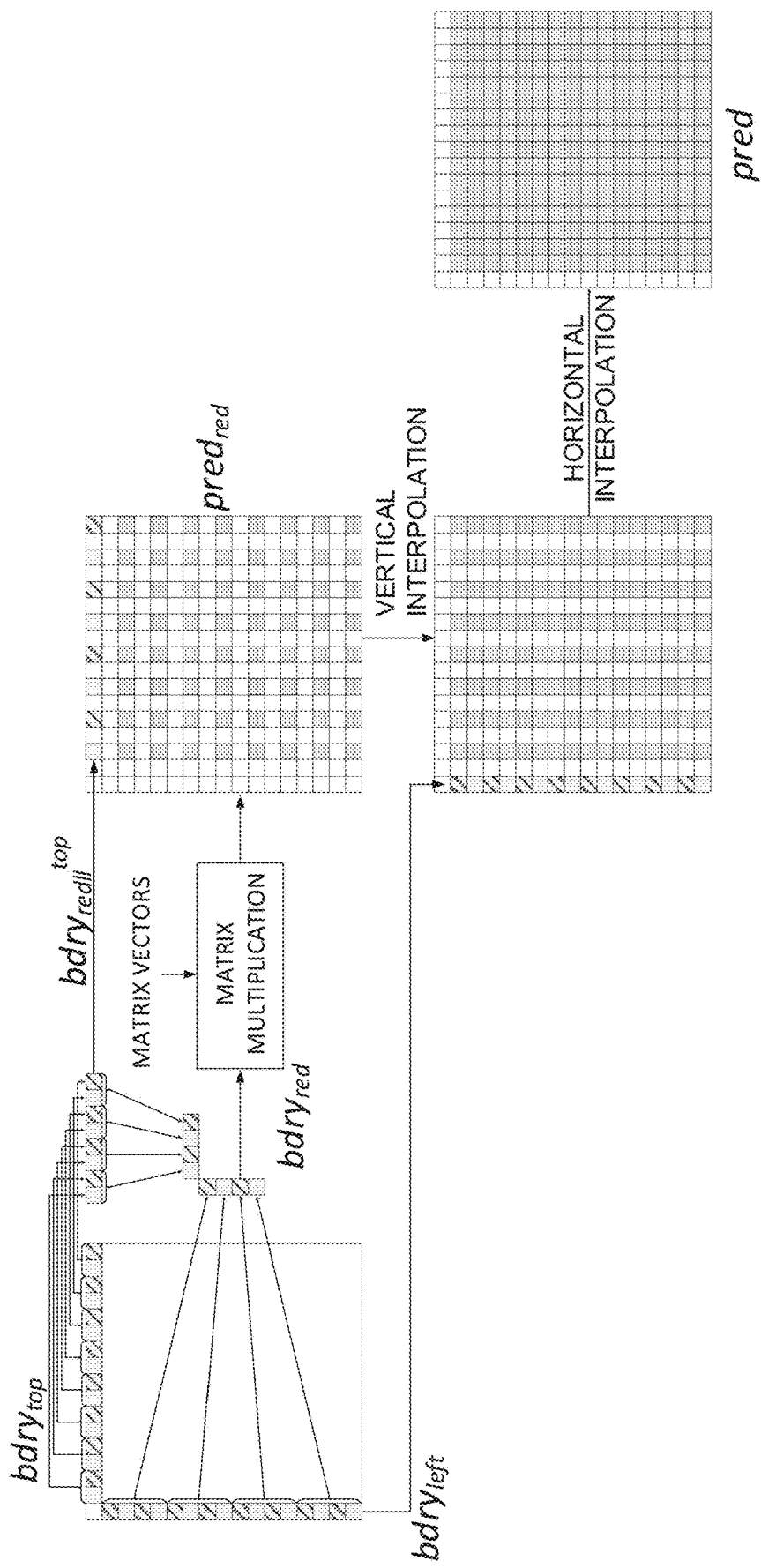
FIG. 9 illustrates MIP for a 16×16 prediction block.

FIG. 9 shows an example MIP process for a 16×16 block:
In the current version of VVC, MIP is applied for luma component.

The MIP process as described above has a number of drawbacks. The reduced boundary bdry$_{red}$ samples are derived by averaging samples from original boundaries bdry$_{left}$ and bdry$_{top}$. The samples average requires addition operations and shift operations that increase the decoder and encoder computational complexity and latency, especially for hardware implementations. In the current version of VVC, the maximum dimension of a block which is predicted by MIP is 64×64. To derive one sample of the bdry$_{red}$, the maximum number of original samples used in the average operation is 64/4=16. The computational complexity for this average operation is 16 additions and 1 shift.

Further, when the matrix multiplication produces a reduced prediction block comprising a subset of the prediction samples in the final prediction block, linear interpolation is used to obtain the remaining prediction samples.

Given a W×H block, where both W≥16 and H≥16, the reduced boundary bdry$_{red}$ samples are derived in two steps:
If H≤W, first, bdry$_{redII}^{top}$ contains 8 samples that are derived by averaging every W/8 samples of the top boundary. Secondly, bdry$_{red}$ contains 8 samples that are derived from averaging every H/4 samples of the left boundary and averaging every two samples of the bdry$_{redII}^{top}$.
If H>W, first the bdry$_{redII}^{left}$ contains 8 samples are derived by averaging every H/8 samples of left boundary. Secondly, the bdry$_{red}$ contains 8 samples are derived from averaging every two of the bdry$_{redII}^{left}$ and every W/4 samples of the top boundary.

The intermediate reduced boundaries bdry$_{redII}^{top}$ and bdry$_{redII}^{left}$ are used for the vertical and horizontal linear interpolation respectively. This two-step derivation process of the reduced boundary bdry$_{red}$ increases the encoder and decoder latency.

Figure 10:
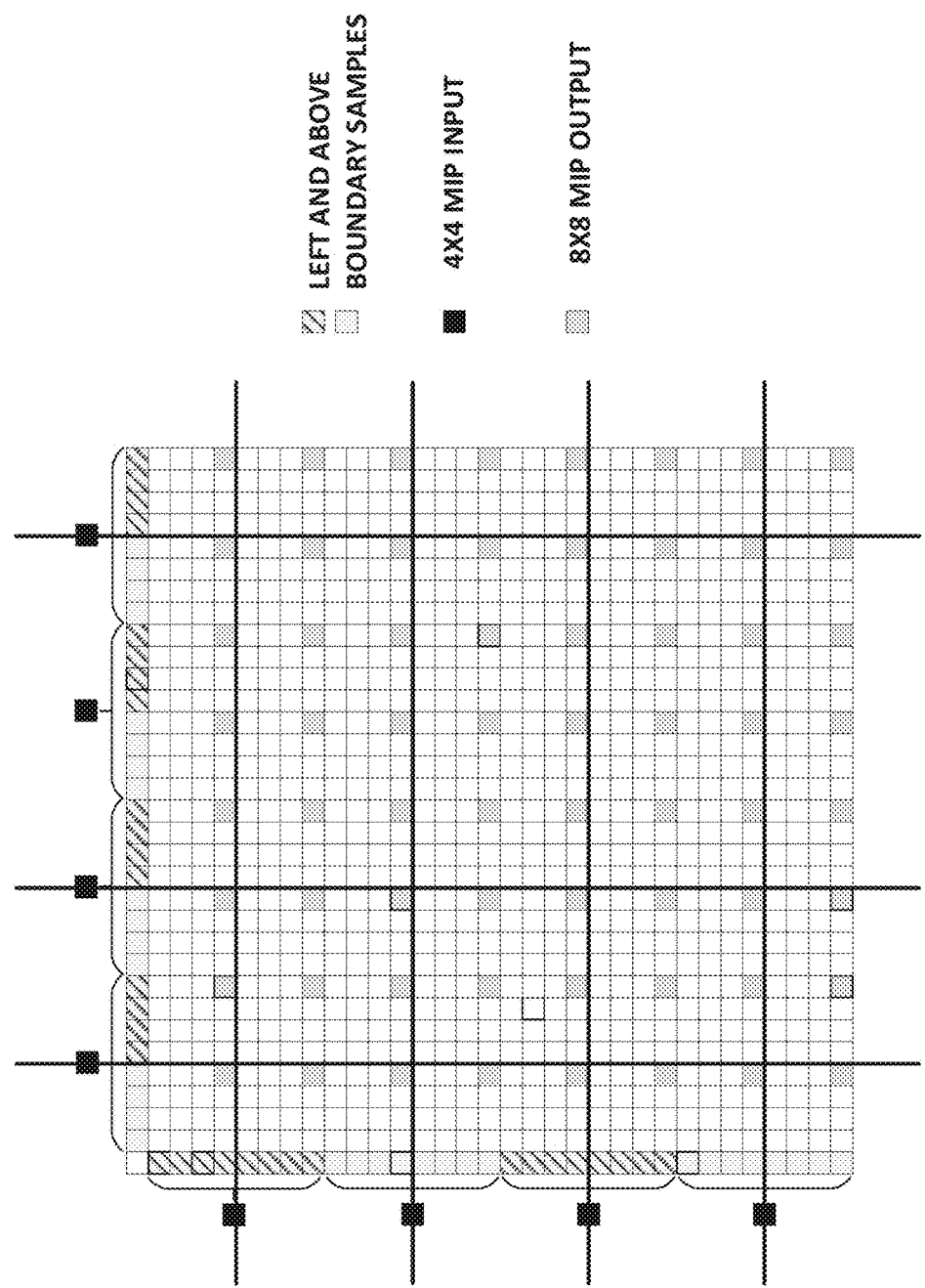
FIG. 10 illustrates misalignment between reduced boundary samples input to a MMU and the MMU output.

Another drawback to using MIP is that the reduced boundary samples used for input to the MMU do not align with the output of the MMU. Averaging of N adjacent boundary samples in a horizontal or vertical direction to produce a MMU input in the horizontal or vertical direction gives a MMU input which is centered in-between the two boundary samples in the middle of the sequence. For example, averaging 8 boundary samples yields an MMU input centered between the fourth and fifth sample. The input position is closer to the first of two output samples when MMU output is sparse compared to a density of the prediction block in a vertical or horizontal direction so that the MMU input is biased towards first, third, fifth, etc. MMU output. FIG. 10 illustrates the misalignment problem for the boundary samples used for linear interpolation in the case of a 4×4 MMU input and an 8×8 MMU output.

Figure 11:
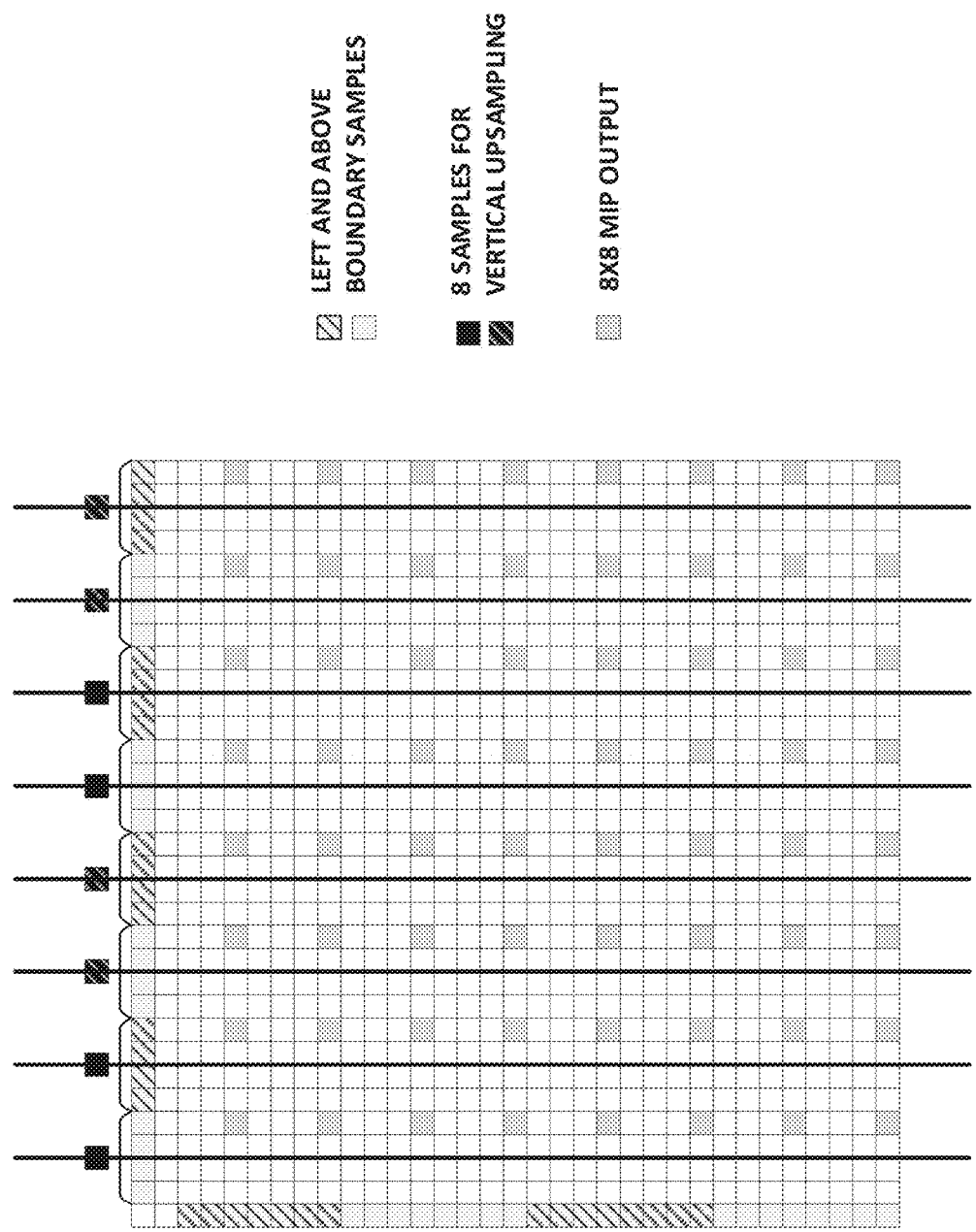
FIG. 11 illustrates misalignment between reduced boundary samples for linear interpolation and the MMU output.

A similar problem occurs with the reduced boundary samples used for linear interpolation. Samples used for linear interpolation in the vertical direction are determined from the average of N boundary samples horizontally and samples used for linear interpolation in the horizontal direction are determined from the average of N boundary samples vertically. This gives filtered boundary samples centered in-between the two boundary samples in the middle and not at the MMU output in the horizontal direction respectively in the vertical direction. FIG. 11 illustrates the misalignment problem for the boundary samples used for linear interpolation in the case of an 8×8 MMU output.

One aspect of the present disclosure is to provide techniques that enable alignment of reduced boundary samples used for either matrix multiplication or interpolation with the output of the MMU while maintaining coding efficiency. Various techniques are described for downsampling a set of input boundary samples to produce a set of reduced boundary samples that are aligned with the MMU output in at least one direction. In one embodiment, the reduced boundary samples are derived by downsampling input boundary samples using a filter that is centered on an output of the MMU in either a vertical or horizontal direction, or by averaging boundary samples centered on an output of the MMU. In other embodiments, the reduced boundary samples are derived without averaging by selecting the input boundary samples that are aligned with corresponding outputs of the MMU. The reduced boundary samples, generated with or without averaging, can be used as input to the MMU or for linear interpolation.

Another aspect of the disclosure is to reduce the computational complexity for deriving the reduced boundary samples by reducing the number of original boundary samples used to derive one reduced boundary sample. Reduction of computational complexity is achieved in some embodiments by reducing the number of input boundary samples that are averaged to generate one reduced boundary sample. For example, the worst case requires reading and averaging 16 input boundary samples to derive one reduced boundary sample. This process requires 16 reads, 15 additions (n−1) and 1 shift. In this example, computational complexity can be reduced by selecting two of the sixteen boundary samples for averaging, which requires two reads, 1 addition and 1 shift. In another embodiment, reduction of computational complexity is achieved by downsampling without averaging. Continuing with the same example, the MIP can be configured to select one of the sixteen original input boundary samples. In this case, only 1 read is required with no addition or shift operations.

Another aspect of the disclosure is to reduce latency by eliminating the two step derivation process for the reduced boundary samples used as input to the MMU. When the matrix multiplication produces a reduced prediction block comprising a subset of the prediction sample in the final prediction block, linear interpolation is used to obtain the remaining prediction samples. In this case, an intermediate reduced boundary is used for interpolating the prediction samples in the first row and/or column of the prediction block. The reduced boundary samples for the top and/or left boundaries are derived from the intermediate reduced boundary. This two-step derivation process for the reduced boundary increases the encoder and decoder latency. In embodiments of the present disclosure, the reduced boundary samples used for matrix multiplication and interpolation respectively are derived in parallel in a single step.

Figure 12:
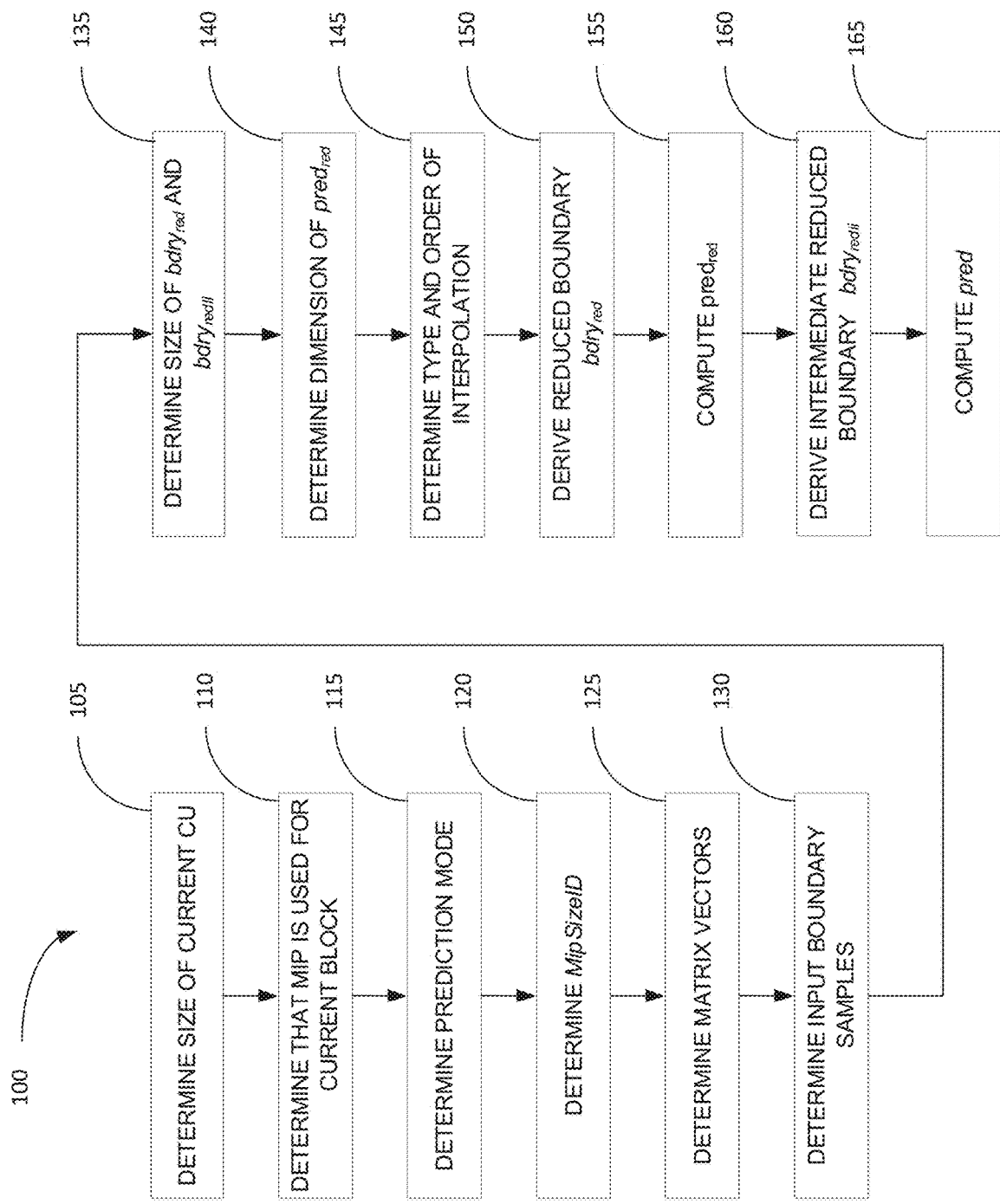
FIG. 12 illustrates a method of MIP implemented by a prediction unit in an encoder or decoder.

FIG. 12 illustrates an exemplary method 100 of encoding or decoding using MIP. The encoder/decoder 24, 44 derives the size of the current CU as a width value W and a height value H, determines that the current block is an intra predicted block and derives a prediction mode for the current block (blocks 105-115). At the decoder 44, these determinations are based on syntax elements in the decoded bitstream. Next, the encoder/decoder 24, 44 derives the mipSizeId from the width W and the height H and determines the matrix vectors for the current block from a matrix vector look-up table using the prediction mode and mipSizeId and as table index (blocks 120 and 125).

Once the block size and matrix vectors are known, the encoder/decoder 24, 44 determines the original boundary sample values for the current block (block 130). The original boundary samples are W samples from the nearest neighboring samples immediately above of the current block and H samples from the nearest neighboring samples to the immediate left of the current block. The values of these samples may be stored in memory 38, 58 of the encoder 24 or decoder 44 respectively. The encoder/decoder 24, 44 determines the size of the reduced boundary $bdry_{red}$ and, if necessary, the size of the intermediate reduced boundary $bdry_{redII}$ (block 135). The encoder/decoder 24, 44 determines the dimension of the reduced prediction signal $pred_{red}$ by the width W and the height H of the current block (block 140). The encoder/decoder 24, 44 also determines whether to apply vertical linear interpolation, horizontal linear interpolation, or both, depending on the width W and height H of the current block (block 145).

For the matrix multiplication, the encoder/decoder 24, 44 derives the reduced boundary $bdry_{red}$ from the original boundary samples as will be hereinafter described in more detail (block 150). The reduced prediction signal $pred_{red}$ is then derived by matrix multiplication of the matrix vector and the reduced boundary $bdry_{red}$ (block 155). In some embodiments, the values of the predicted samples in the reduced prediction block $pred_{red}$ generated by matrix multiplication may be clipped if the values are outside a predetermined range. When linear interpolation is performed, the encoder/decoder 24, 44 derives the intermediate reduced boundary samples $bdry_{redII}$, also referred to herein as interpolation boundary samples, from the original boundary samples and performs linear interpolation to derive the remaining samples of the prediction block pred based on its determination in block 155 (blocks 160 and 165). In some embodiments, if clipping is not done before interpolation, the values of the predicted samples in the prediction block pred generated by matrix multiplication may need to be clipped if the values are outside a predetermined range.

Those skilled in the art will appreciate that in the simplest case of a 4×4 prediction block, linear interpolation will not be required so that interpolation need not be performed.

If the decision is to apply both vertical and horizontal linear interpolation, the encoder/decoder 24, 44 needs to determine the order in which vertical and horizontal interpolation are performed. The decision of which direction to apply first is made based on the width W and height H of the current block. If the decision is to first apply vertical linear interpolation, the encoder/decoder 24, 44 determines the size of the reduced top boundary $bdry_{redII}^{top}$ for the vertical linear interpolation by the width W and the height H of the current block and derives the reduced top boundary $bdry_{redII}^{top}$ from the original top boundary samples. If the decision is to first apply horizontal linear interpolation, the encoder/decoder 24, 44 determines the size of the reduced left boundary $bdry_{redII}^{left}$ for the horizontal linear interpolation by the width W and the height H of the current block and derives the reduced left boundary $bdry_{redII}^{left}$ from the original left boundary samples.

The method of intra prediction as shown in FIG. 12 can be performed by the encoder 24 or decoder 44. In an encoder 24, the prediction block 24 is subtracted from the current block to derive the residual as shown in FIG. 2. The residual is then encoded for transmission to the destination device 40. In a decoder 44, the prediction block 24 is calculated and added to the decoded residual received from the source device 20 as shown in FIG. 3 in obtain the output video.

Some embodiments of the disclosure reduce complexity of the MIP by using a simplified downsampling approach to derive the intermediate reduced boundary samples without averaging. Given a W×H block, when both the horizontal and vertical linear interpolation are applied to the current block, the encoder/decoder 24, 44 determines the order in which vertical linear interpolation and horizontal linear interpolation are performed. If H≤W, the vertical linear interpolation is applied first to the reduced prediction signal $pred_{red}$. The reduced top boundary $bdry_{redII}^{top}$ samples for the vertical linear interpolation are derived by taking every K-th sample of the original top boundary samples without average operation. If H>W, the horizontal linear interpolation is applied first to the reduced prediction signal $pred_{red}$. The reduced left boundary $bdry_{redll}^{left}$ samples for the horizontal linear interpolation are derived by taking every K-th sample of the original left boundary samples without average operation.

The number K is a down-sampling factor which is determined by the width W and height H of the current block. The value of K can be equal to 2, 4 or 8. For example, the value K can be selected according to the following rules:
  If H≤W and W=8, K=2.
  If H≤W and W>8, K=W/8, where W=16, 32 or 64.
  If H>W, K=H/8, where H=16, 32 or 64.

The reduced boundary $bdry_{redll}$ samples derivation process is as follows. A position (xCb, yCb) specifies the position of the top-left sample the current coding block of the current picture. The positions of the top boundary samples are (xT, yT), where xT=xCb . . . xCb+W−1, yT=yCb−1. The positions of the left boundary samples are (xL, yL), where xL=xCb−1, yL=yCb . . . yCb+H−1. The dimension of the reduced prediction signal is predW×predH. The values of predW and predH can be determined as follows:
  If W≤8 and H≤8, predW=predH=4.
  If W>8 and H=4, predW=8, predH=4.
  If W=4 and H>8, predW=4, predH=8.
  Otherwise, predW=8, predH=8.

If the decision is to first apply the vertical linear interpolation, the downsampling factor K is derived as equal to (W/predW). The reduced top boundary $bdry_{redll}^{top}$ samples are derived from every K-th sample of the original top boundary samples. The position (x, y) for the K-th sample of the original top boundary samples is specified as:
  x=xCb+n×K−1, where n ranges from 1 to predW.
  y=yCb−1.

If the decision is to first apply the horizontal linear interpolation, the downsampling factor K is derived as equal to (H/predH). The reduced left boundary $bdry_{redll}^{left}$ samples are derived from every K-th sample of the original left boundary samples. The position (x, y) for the K-th sample of the original left boundary samples is specified as:
  x=xCb−1.
  y=yCb+n×K−1, where n ranges from 1 to predH.

Figure 13:
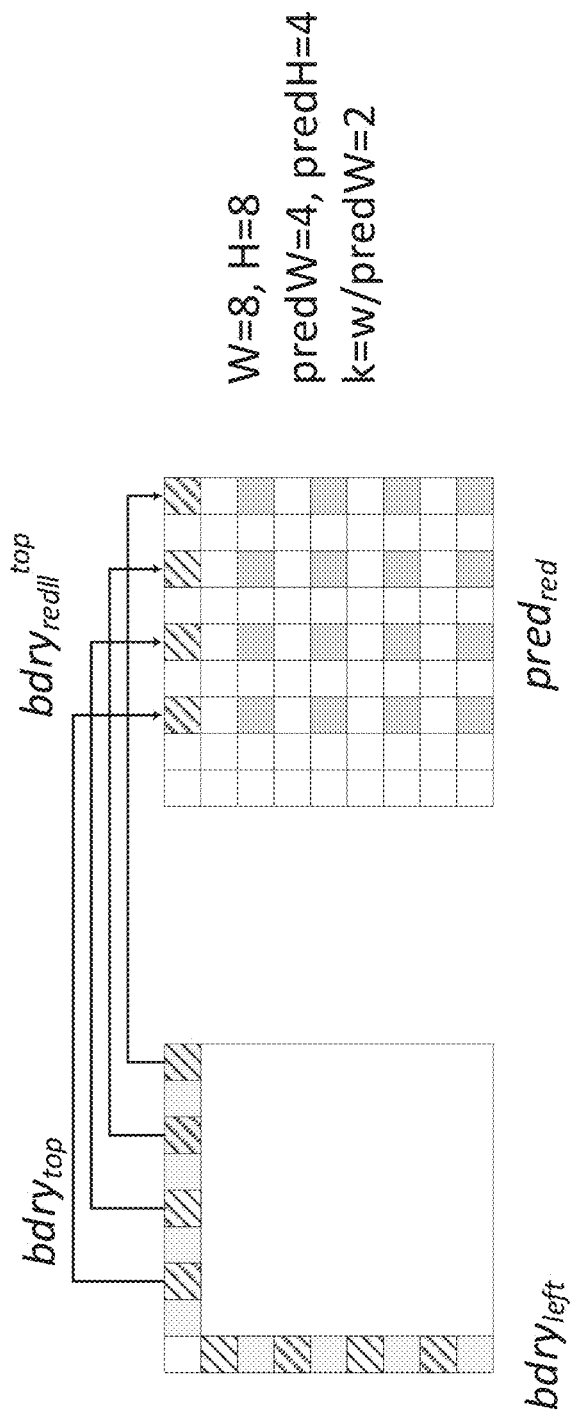
FIG. 13 illustrates downsampling input boundary samples without averaging to derive the top interpolation boundary samples for vertical linear interpolation.
Figure 14:
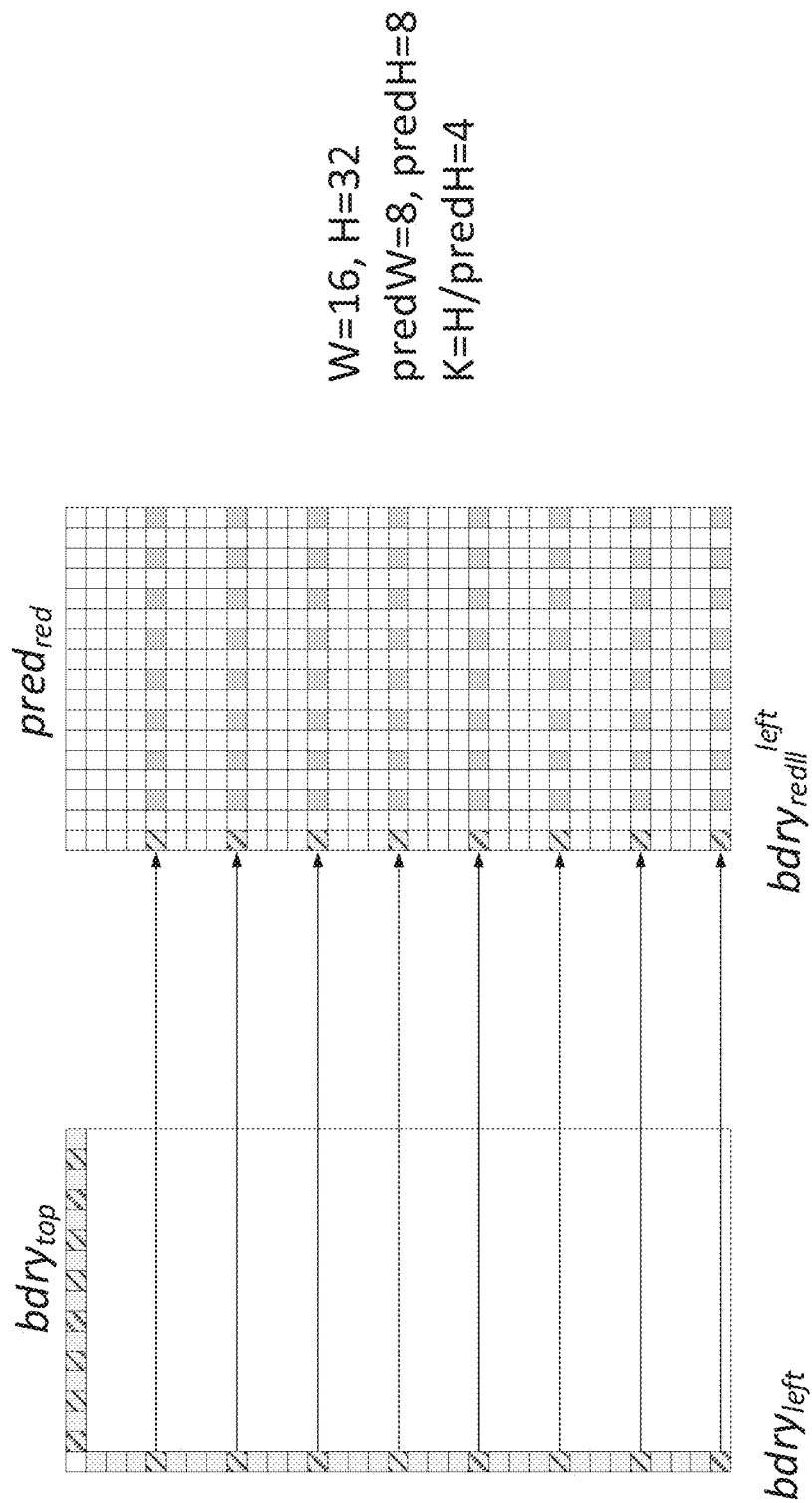
FIG. 14 illustrates downsampling input boundary samples without averaging to derive the left interpolation boundary samples for horizontal linear interpolation.

FIG. 13 illustrates an exemplary downsampling method used to derive the interpolation boundary samples for vertical linear interpolation without averaging. Given a W×H block, where W=8 and H=8, the vertical linear interpolation is first applied to the reduced prediction signal $pred_{red}$. The dimension of the reduced prediction signal is predW×predH, where, predW=4 and predH=4. The 4 reduced top boundary $bdry_{redll}^{top}$ samples for the vertical linear interpolation are derived by taking every 2-nd of the original top boundary samples as shown in FIG. 13:

Given a W×H block, where W≥16 and H≥16 and H≤W, the vertical linear interpolation is applied first to the reduced prediction signal $pred_{red}$. The dimension of the reduced prediction signal is predW×predH, where, predW=8 and predH=8. The 8 reduced top boundary $bdry_{redll}^{top}$ samples for the vertical linear interpolation are derived from every K-th (K=W/8) of the original top boundary samples. If H>W, the horizontal linear interpolation is first applied to the reduced prediction signal. The dimension of the reduced prediction signal is predW×predH, where, predW=8 and predH=8. The 8 reduced left boundary $bdry_{redll}^{left}$ samples for the horizontal linear interpolation are derived from every K-th (K=H/8) of the original left boundary samples. FIG. 14 shows an example of reduced left boundary for a 16×32 block.

Some embodiments of the disclosure use a simplified downsampling approach to derive the reduced boundary samples for matrix multiplication. Given a W×H block, when the current block is a matrix based intra predicted block, the reduced boundary $bdry_{red}$ is used for matrix multiplication. The $bdry_{red}$ samples are derived from every L-th sample of the original boundary samples without average operation. The number L is a down-sampling factor which is determined by the width W and height H of the current block. The number L for the left and top boundary is further specified as $L_{left}$ and $L_{top}$ respectively, where:
  $L_{left}=L_{top}$, when W equals to H
  $L_{left} \neq L_{top}$, where W≠H The value of L can be equal to 1, 2, 4, 8 or 16. For example, the value of L can be selected according to the following rules:
  If W=4 and H=4, $L_{left}=L_{top}=2$.
  If W>4 or H>4,
    $L_{left}$=H/4 when H=4, 8, 16, 32 or 64.
    $L_{top}$=W/4 when W=4, 8, 16, 32 or 64.

The reduced boundary $bdry_{red}$ samples derivation process is as follows. A position (xCb, yCb) specifies the position of the top-left sample the current coding block of the current picture. The position for top boundary samples are (xT, yT), where xT=xCb . . . xCb+W−1, yT=yCb−1. The position for left boundary samples are (xL, yL), where xL=xCb−1, yL=yCb . . . yCb+H−1. The size of the reduced boundary $bdry_{red}$ is LenW+LenH, where LenW specifies the number of reduced boundary samples from the original top boundary, LenH specifies the number of reduced boundary samples from the left boundary. In the current version of VVC, LenW and LenH are determined as follows:
  If W=H=4, LenW=LenH=2.
  If W>4 or H>4, LenW=LenH=4.

The downsampling factor $L_{top}$ is derived as equal to (W/LenW). The reduced top boundary $bdry_{red}^{top}$ samples are derived from every $L_{top}$-th sample of the original top boundary samples. The position (x, y) for the $L_{top}$-th sample of the original top boundary samples is specified as:
  x=xCb+n×$L_{top}$−1, where n ranges from 1 to LenW.
  y=yCb−1.

The downsampling factor Lleft is derived as equal to (H/LenH). The reduced left boundary $bdry_{red}^{left}$ samples are derived from every $L_{left}$-th sample of the original left boundary samples. The position (x, y) for the $L_{left}$-th sample of the original left boundary samples is specified as:
  x=xCb−1.
  y=yCb+n×$L_{left}$−1, where n ranges from 1 to LenH.

Figure 15:
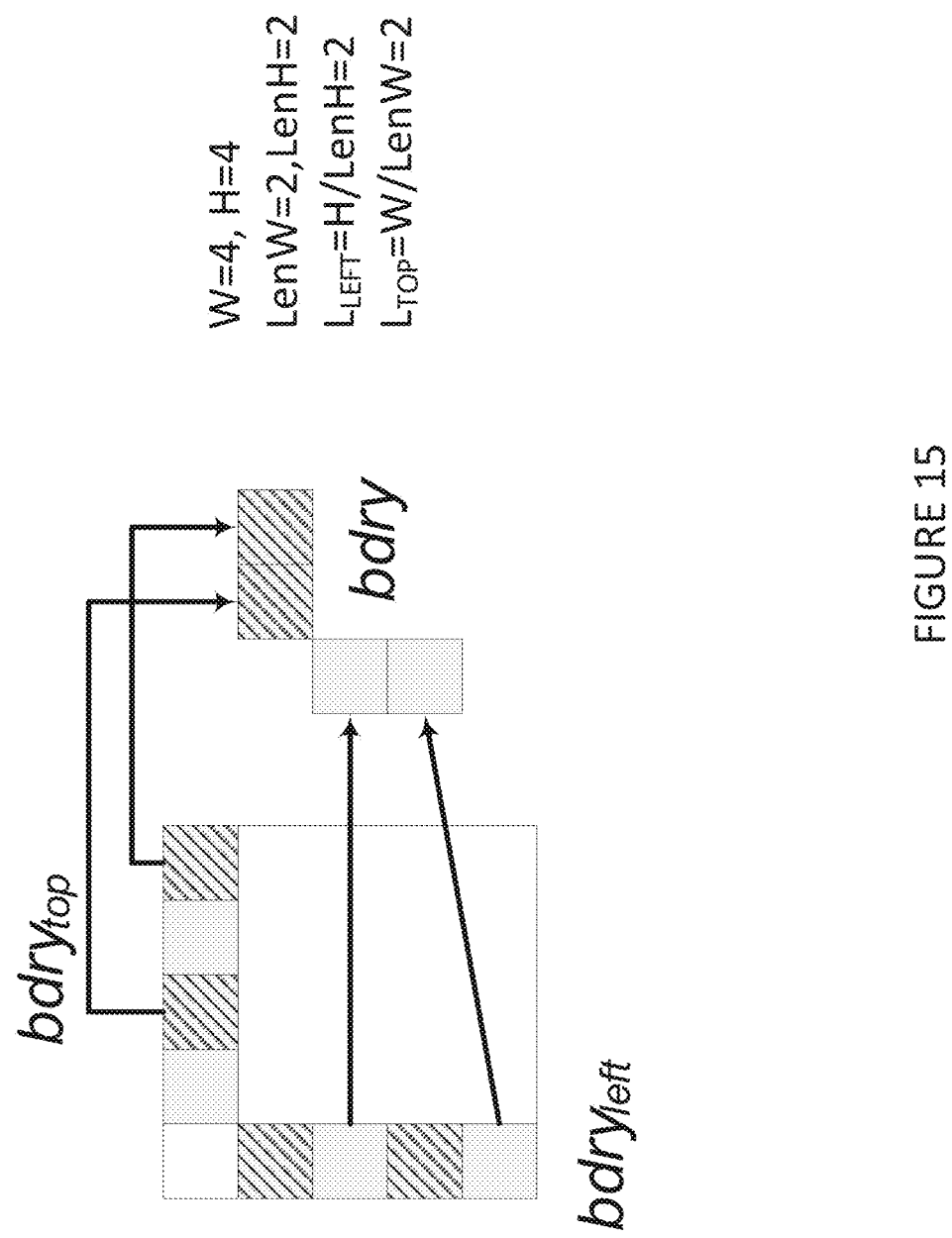
FIG. 15 illustrates downsampling input boundary samples without averaging to derive the reduced boundary samples for matrix multiplication.

FIG. 15 illustrates an exemplary downsampling method used to derive the reduced boundary samples for input to the MMU for a W×H block, where W=4 and H=4. In this example, the size of the reduced boundary $bdry_{red}$ is LenW+LenH, where, LenW=2 and LenH=2. The reduced boundary $bdry_{red}$ samples are derived from every 2-nd sample of the original top boundary samples and every 2-nd sample of the original left boundary.

Figure 16:
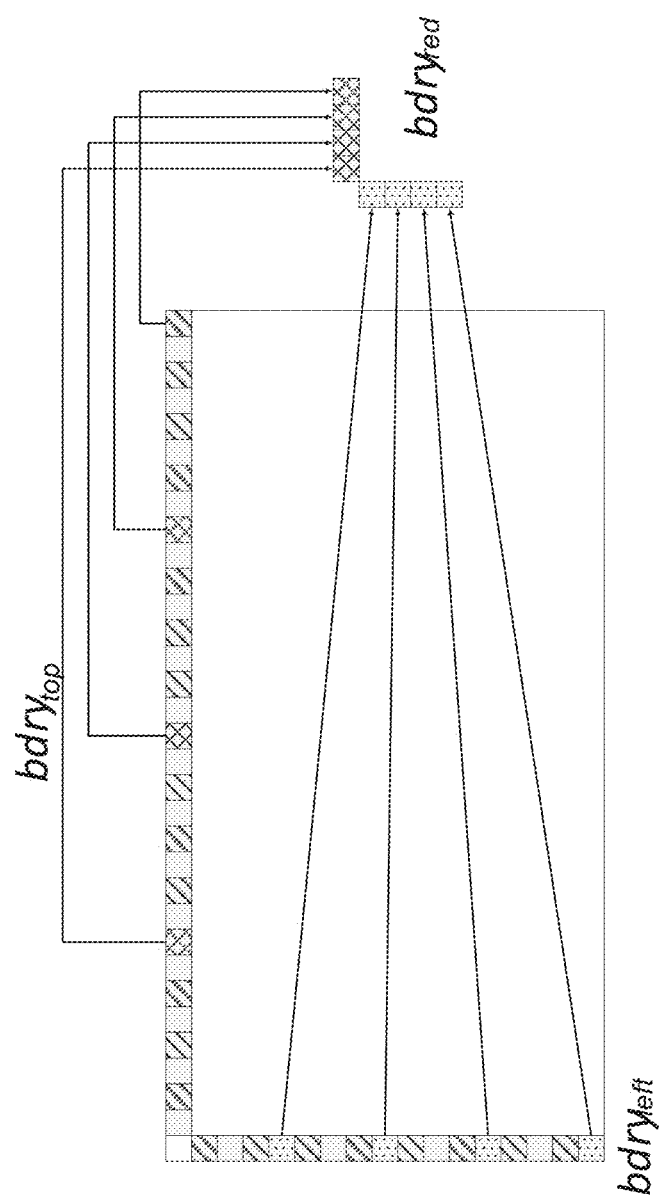
FIG. 16 illustrates downsampling input boundary samples without averaging to derive the reduced boundary samples for matrix multiplication.

FIG. 16 illustrates an exemplary downsampling method used to derive the reduced boundary samples for input to the MMU for a W×H block, where W=32 and H=16. In this example, the size the reduced boundary $bdry_{red}$ is LenW+LenH, where, LenW=4 and LenH=4. The reduced boundary samples are derived from every 8-th sample of the original top boundary samples and every 4-th sample of the original left boundary samples.

Given a W×H block, the decision whether to apply the method to derive the reduced boundary $bdry_{red}$ for matrix multiplication from every L-th sample of the original boundary samples without average operation is determined by the size of $bdry_{red}^{left}$ and $bdry_{red}^{top}$ and the dimension predW× predH of the reduced predicted signal $pred_{red}$.

In this embodiment, when the size of $bdry_{red}^{left}$=predH, the matrix multiplication does not carry out vertical upsampling. Instead, the samples of $bdry_{red}^{left}$ are derived from every $L_{left}$-th sample of the original left boundary samples without average operation. In the current version of VVC, when the current block is a W×4 block, where W>4, the size of $bdry_{red}^{left}$ equals to predH. Therefore, the samples of $bdry_{red}^{left}$ are in this embodiment derived from the original left boundary samples without average, where $L_{left}$=1. One example of an 8×4 block is shown in FIG. 5.

In this embodiment, when the size of $bdry_{red}^{top}$=predW, the matrix multiplication does not carry out a horizontal up-sampling. Instead, the samples of $bdry_{red}^{top}$ are derived from every $L_{top}$-th sample of the original top boundary samples without average operation. In the current version of VVC, when the current block is a 4×H block, where H>4, the size of $bdry_{red}^{top}$ equals to predW. Therefore, the samples of $bdry_{red}^{top}$ are in this embodiment derived from the original top boundary samples without average, where $L_{top}$=1.

Some embodiments of the disclosure use a simplified downsampling approach that reduces the computational complexity involved in computing averages of boundary samples. Given a W×H block, when the current block is a matrix based intra predicted block, the reduced boundary $bdry_{red}$ is used for matrix multiplication. The $bdry_{red}$ samples are derived by averaging N (where N>1) samples from every M-th sample of the original boundary samples.

The number N is the matrix multiplication up-sampling factor which is determined by the dimension (predW× predH) of the reduced predicted signal $pred_{red}$ and the size (LenW+LenH) of the reduced boundary $bdry_{red}$, where, predW, predH, LenW and LenH are determined by the width W and height H of the current block. The number N for the left and top boundary is further specified as $N_{left}$ and $N_{top}$, where:

If predH>LenH, the matrix multiplication carries out a vertical up-sampling, in this case, $N_{left}$=predH/lenH If predW>LenW, the matrix multiplication carries out a horizontal up-sampling, in this case, $N_{top}$=predW/lenW In the current version of VVC, when the matrix multiplication carries out up-sampling, the supported up-sampling factor N is 2.

The number M is a down-sampling factor which is determined by the width W and height H of the current block. The number M for the left and top boundary is further specified as $M_{left}$ and $M_{top}$ respectively, where:

$M_{left}$=$M_{top}$, where W equals to H $M_{left}$≠$M_{top}$, where W≠H

The value of M can be 1, 2, 4 or 8. For example, the value M can be selected according to the following rules:

If W=4 and H=4, $M_{left}$=Mtop=1.

If W≥4 and $M_{left}$=H/predH, where H=8, 16, 32 or 64, predH=8.

If W>8 and H>4, $M_{top}$=W/predW, where W=8, 16, 32 or 64, predW=8

The reduced boundary $bdry_{red}$ samples derivation process is as follows. A position (xCb, yCb) specifies the position of the top-left sample the current coding block of the current picture. The position for top boundary samples are (xT, yT), where xT=xCb . . . xCb+W-1, yT=yCb-1. The position for left boundary samples are (xL, yL), where xL=xCb-1, yL=yCb . . . yCb+H-1. The size of the reduced boundary $bdry_{red}$ is LenW+LenH, where LenW specifies the number of reduced boundary samples from the original top boundary, LenH specifies the number of reduced boundary samples from the left boundary. The dimension of the reduced prediction signal $pred_{red}$ is predW×predH, where predW specifies the width sample of the $pred_{red}$, predH specifies the height of the $pred_{red}$. The values of LenW, LenH, predW and predH can be determined as follows:

If W=H=4, LenW=LenH=2, predW=predH=4.

Otherwise, if W≤8 and H≤8, LenW=LenH=4, predW=predH=4.

Otherwise, if W=4 and H>8, LenW=LenH=4, predW=4, predH=8.

Otherwise, if W>8 and H=4, LenW=LenH=4, predW=8, predH=4.

Otherwise, LenW=LenH=4, predW=predH=8.

The downsampling factor $M_{top}$ is derived as equal to (W/predW). The reduced top boundary $bdry_{red}^{top}$ samples are derived by averaging two samples $(x_0, y_0)$ and $(x_1, y_1)$ from every $M_{top}$-th sample of the original top boundary samples. The positions $(x_0, y_0)$ and $(x_1, y_1)$ for the $M_{top}$-th sample of the original top boundary samples are specified as:

x0=xCb+(2×n-1)×$M_{top}$-1 x1=xCb+(2×n)×$M_{top}$-1, where n ranges from 1 to LenW.

y0=y1=yCb-1.

The down-sampling factor $M_{left}$ is derived as equal to (H/predH). The reduced left boundary $bdry_{red}^{left}$ samples are derived by averaging two samples $(x_0, y_0)$ and $(x_1, y_1)$ from every $M_{left}$-th sample of the original left boundary samples. The positions $(x_0, y_0)$ and $(x_1, y_1)$ for the $L_{left}$-th sample of the original left boundary samples are specified as:

x0=x1=xCb-1.

y0=yCb+(2×n-1)×$M_{left}$-1 y0=yCb+(2×n)×$M_{left}$-1, where n ranges from 1 to LenH.

Given a W×H block, where W=4 and H=4, the size the reduced boundary $bdry_{red}$ is LenW+LenH, where, LenW=2 and LenH=2. The reduced boundary $bdry_{red}$ samples are derived the same as the current version of VVC as shown in FIG. 4.

Figure 17:
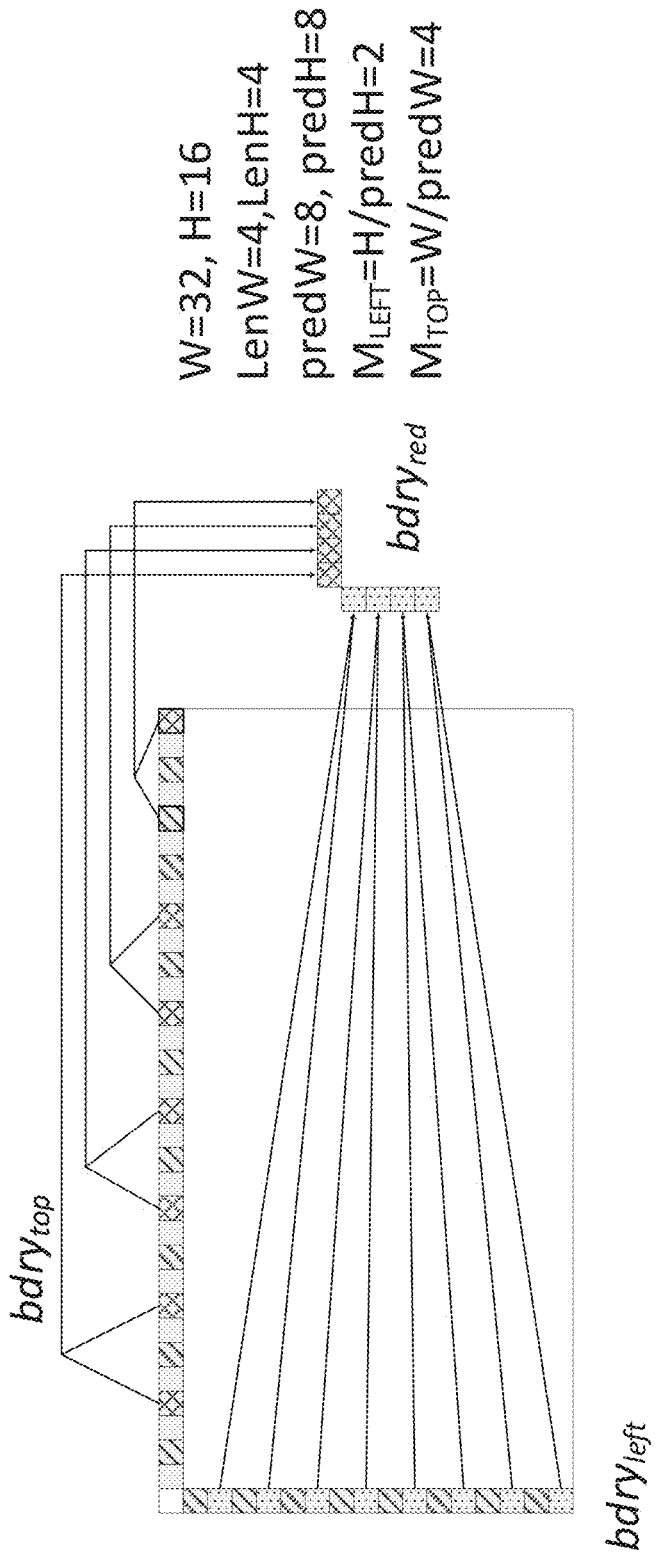
FIG. 17 illustrates downsampling input boundary samples without averaging to derive the reduced boundary samples for both matrix multiplication and linear interpolation.

FIG. 17 illustrates an exemplary downsampling method used to derive the reduced boundary samples for input to the MMU for a W×H block, where W=32 and H=16. The size the reduced boundary $bdry_{red}$ is LenW+LenH, where, LenW=4 and LenH=4. The dimension of the reduced prediction signal is predW×predH, where predW=8 and predH=8. The reduced boundary $bdry_{red}$ samples are derived by averaging 2 samples from every 4-th sample of the original top boundary samples and every 2-nd of the original left boundary as shown in FIG. 17.

The downsampling techniques as herein described, in addition to reducing computational complexity, provide a useful technique for aligning the reduced boundary samples used for matrix multiplication and linear interpolation with the output of the MMU. In some embodiments, at least one sample is derived from the horizontal boundary for MMU input with a low pass filter centered in-between two MMU output samples horizontally when MMU output is sparse in the horizontal direction and with a filter centered in-between two MMU output samples vertically when MMU output is sparse in the vertical direction. One example of a filter centered in-between two MMU output samples in one direction is [1 0 1]/2 when MMU output comes every second sample 'x' MMUOut(1) 'x' MMUOut(2). This gives a MMU input which is centered in-between MMUOut(1) and MMUOut(2). This can be implemented as ('a'+'b'+1)>>1 where 'a' is aligned with MMUOut(1) and 'b' is aligned with MMUOut(2). Another example is [1 2 1]/4 which can be implemented as '(a'+2*'c'+'b')>>2 where 'a' is aligned with MMUOut(1) and 'b' is aligned with MMUOut(2) and 'c' is aligned with a sample in-between MMUOut(1) and MMUOut(2).

In other embodiments, alignment can be obtained by selecting the boundary samples used for averaging such that the selected boundary samples being averaged are centered on an output of the MMU.

Similar techniques can be used to derive the reduced boundary samples for interpolation. Thus, in some embodiments, at least one sample is derived from horizontal boundary samples which is aligned with at least one MMU output sample horizontally. The derived sample is used for interpolation of a sample in-between the MMU output sample and the derived sample in the vertical direction. In another embodiments, at least one sample is derived from vertical boundary samples and is aligned with at least one MMU output sample vertically. The derived samples is used for interpolation of a sample in-between the MMU output sample and the derived sample in the horizontal direction. One example is to use a filter of size N=1 to derive a boundary sample. This corresponds to copy the boundary samples that are aligned with the MMU output in the horizontal direction when interpolation samples in the vertical direction and copy boundary samples that are aligned with the MMU output in the vertical direction when interpolating samples in the horizontal direction. Another example is to use a filter of size N=3 with filter coefficients [1 2 1]/4 to generate an aligned boundary sample. This can be implemented as '(a'+2*'c'+'b')>>2, where 'c' is a boundary sample aligned with the MMU output sample that is to be used for interpolation and 'a' and 'b' are neighboring boundary samples at equal distance from the boundary sample 'c'.

Figure 18:
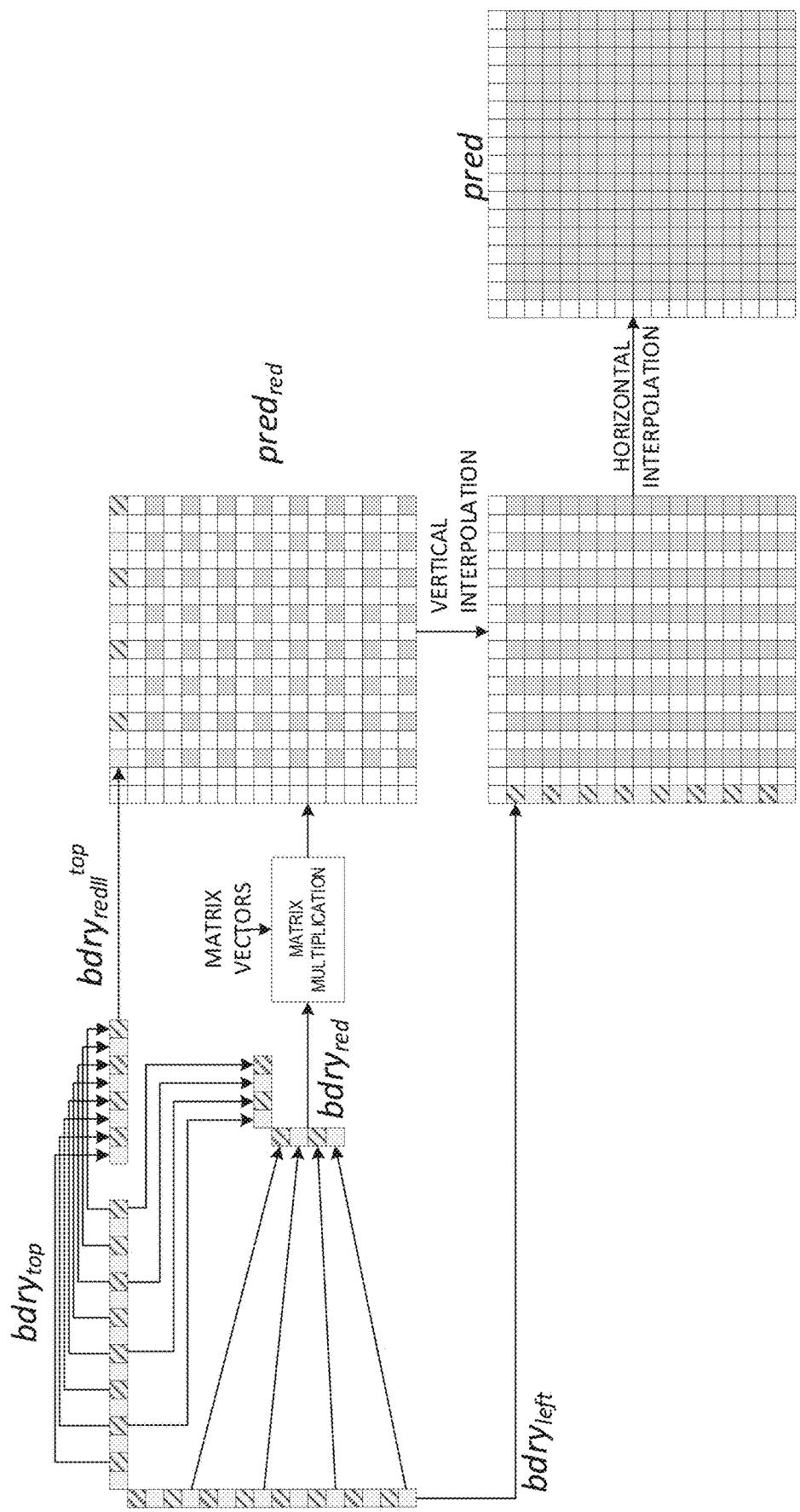
FIG. 18 illustrates one-step downsampling input boundary samples using averaging to derive reduced boundary samples for matrix multiplication.

The methods described above to derive the reduced boundary samples for matrix multiplication and linear interpolation can be used independently or in combination. FIG. 18 illustrates an example where simplified downsampling without averaging is used for deriving the reduced boundary samples for both liner interpolation and matrix multiplication. In this example, the current block has dimension W×H where W=H=16. The intermediate reduced boundary $bdry_{redII}$ has dimensions 8×8 and the reduced boundary $bdry_{red}$ has dimensions 4×4. The boundary samples for $bdry_{redII}^{top}$ and $bdry_{red}^{top}$ are derived at the same time in parallel from the original boundary samples $bdry_{top}$ without averaging. In other embodiments, averaging could be used to derive the intermediate reduced boundary $bdry_{redII}$, the reduced boundary $bdry_{red}$, or both As noted earlier, the two-step derivation process for the reduced boundary $bdry_{red}$ when linear interpolation is performed increases the latency of the encoder 24 and decoder 44. As an example, assume that we want to process a 16×16 block and that the first samples of bdrytop are $bdry^{top}$=510, 511, 510, 510, . . .

In the prior art, the first two samples 510 and 511 would be averaged using addition and shift: (510+511+1)>>1=1022>>1=511, where >> denotes rightwards arithmetic shift. Likewise, the next two samples 510 and 510 would be averaged to (510+510+1)>>1=1021>>1=510. Hence the first two samples of $bdry_{redII}^{top}$ would become:

$bdry_{redII}^{top}$=511, 510, . . .

The first two samples of $bdry_{redII}^{top}$ are then used to calculate $bdry_{red}^{top}$ using (511+510+1)>>1=1022>1=511. Hence the first sample in $bdry_{red}^{top}$ would become $bdry_{red}^{top}$=511, . . .

Now, due to latency we would like to calculate $bdry_{red}^{top}$ in one step. However, a straight-forward implementation would be to add the four first number in $bdry^{top}$ together with the constant two for rounding and then shift two steps:

one_step_$bdry_{red}^{top}$=(510+511+510+510+2)>>2=2043>>2=510

However, the result of this calculation, one_step_$bdry_{red}^{top}$=510, does not give the same result as the two step approach of calculating $bdry_{red}^{top}$=511 described above. This error will lead to drift in the decoder, which is not desirable.

Hence, in one embodiment of the present disclosure, $bdry_{red}^{top}$ is calculated according to:

alt_one_step_bdryredtop=(510+511+510+510+3)>>2=2044>>2=511.

This approach reduces the latency compared to first calculating aa=(a+b+1)>>1 and bb=(b+c+1)>>1 followed by a second step aaa=(aa+bb+1)>>1.

The difference in this approach is that the sum is calculated by adding 3 instead of adding two to yield the same behavior as the two-step approach. The equivalency of the one-step approach can be demonstrated with a simple example. Assume that the first four boundary samples in $bdry^{top}$ are denoted a, b, c and d respectively, and that the first two boundary samples in $bdry_{redII}^{top}$ are denoted aa and bb respectively. In this example, aa=(a+b+1)>>1 and bb=(c+d+1)>>1. The first sample in $bdry_{red}^{top}$, denoted aaa, is calculated as (aa+bb+1)>>2. As shown in Table 1 below, adding value 2 to the sum of a, b, c, and d ((a+b+c+d+2)>>2) produces an error when only one of the values of a, b, c and d equals 1 and the others equal 0, while adding 3 (a+b+c+d+3)>>2 produces the correct result.

TABLE 1

Comparison of Averaging Approaches

| a | b | c | d | aa | bb | aaa | (a + b + c + d + 2) >> 2 | (a + b + c + d + 3) >> 2 |
|---|---|---|---|----|----|----|---|---|
| 0 | 0 | 0 | 0 | 0 | 0 | 0 | 0 | 0 |
| 0 | 0 | 0 | 1 | 0 | 1 | 1 | 0 | 1 |
| 0 | 0 | 1 | 0 | 0 | 1 | 1 | 0 | 1 |
| 0 | 0 | 1 | 1 | 0 | 1 | 1 | 1 | 1 |
| 0 | 1 | 0 | 0 | 1 | 0 | 1 | 0 | 1 |
| 0 | 1 | 0 | 1 | 1 | 1 | 1 | 1 | 1 |
| 0 | 1 | 1 | 0 | 1 | 1 | 1 | 1 | 1 |
| 0 | 1 | 1 | 1 | 1 | 1 | 1 | 1 | 1 |
| 1 | 0 | 0 | 0 | 1 | 0 | 1 | 0 | 1 |
| 1 | 0 | 0 | 1 | 1 | 1 | 1 | 1 | 1 |
| 1 | 0 | 1 | 0 | 1 | 1 | 1 | 1 | 1 |
| 1 | 0 | 1 | 1 | 1 | 1 | 1 | 1 | 1 |
| 1 | 1 | 0 | 0 | 1 | 0 | 1 | 1 | 1 |
| 1 | 1 | 0 | 1 | 1 | 1 | 1 | 1 | 1 |
| 1 | 1 | 1 | 0 | 1 | 1 | 1 | 1 | 1 |
| 1 | 1 | 1 | 1 | 1 | 1 | 1 | 1 | 1 |

Figure 19:
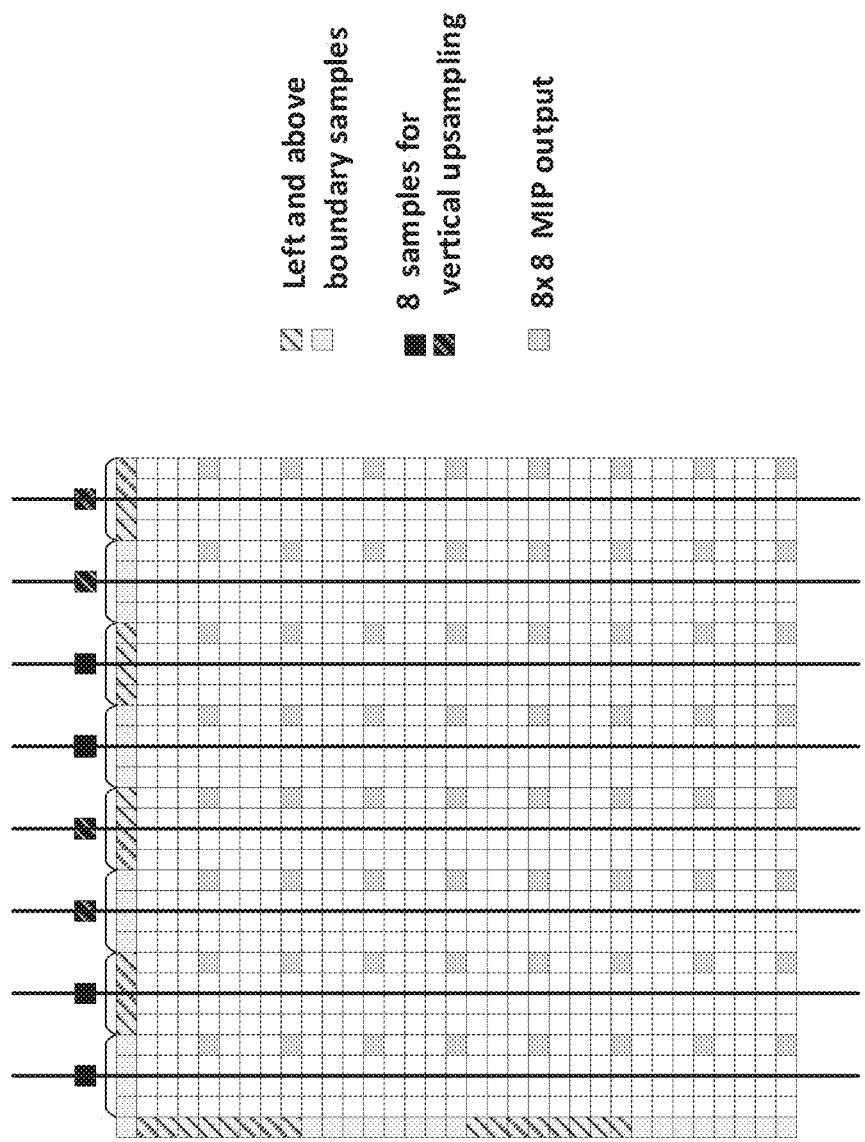
FIG. 19 illustrates misalignment between reduced boundary samples for interpolation and the MMU output.
Figure 20:
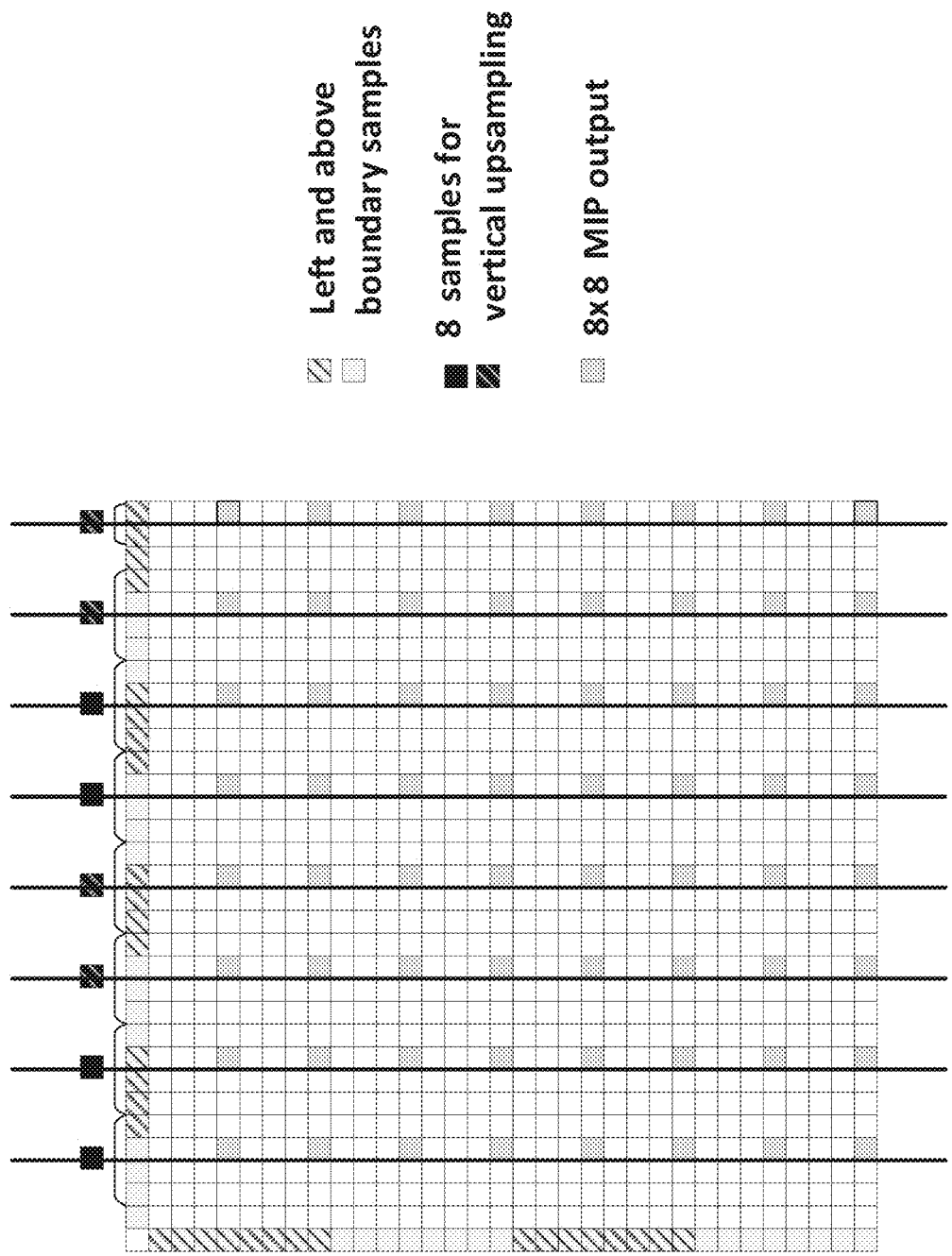
FIG. 20 illustrates shifting of downsampling filters to reduce misalignment between reduced boundary samples for interpolation and the MMU output.

In one embodiment, the misalignment between boundary samples used for interpolation and the MMU output is solved in a different way. Instead of taking a single sample, averaging is performed. However, by changing the samples selected for averaging, it is possible to reduce or eliminate the misalignment. As shown in the FIG. 19, the previous art uses four tap filters to obtain one sample for vertical upsampling. As can be seen in FIG. 19, there is a strong misalignment between the center of the averaged samples (shown as lines) and the red pixels used for MMU output. In this example, the misalignment can be reduced by selecting different samples for the averaging as shown in FIG. 20. As shown in FIG. 20, by shifting the boundary samples selected for averaging one step to the right, the misalignment between the center of the averaged samples (the lines) and the MMU output samples (shown as red pixels) is reduced to one half the width of a boundary sample. However, at the last sample, we can no longer use four samples. Therefore, in one embodiment, we average only over two samples here. An alternative is to use the previous averaging arrangement for this last position, which will result in larger misalignment for this sample.

Figure 21:
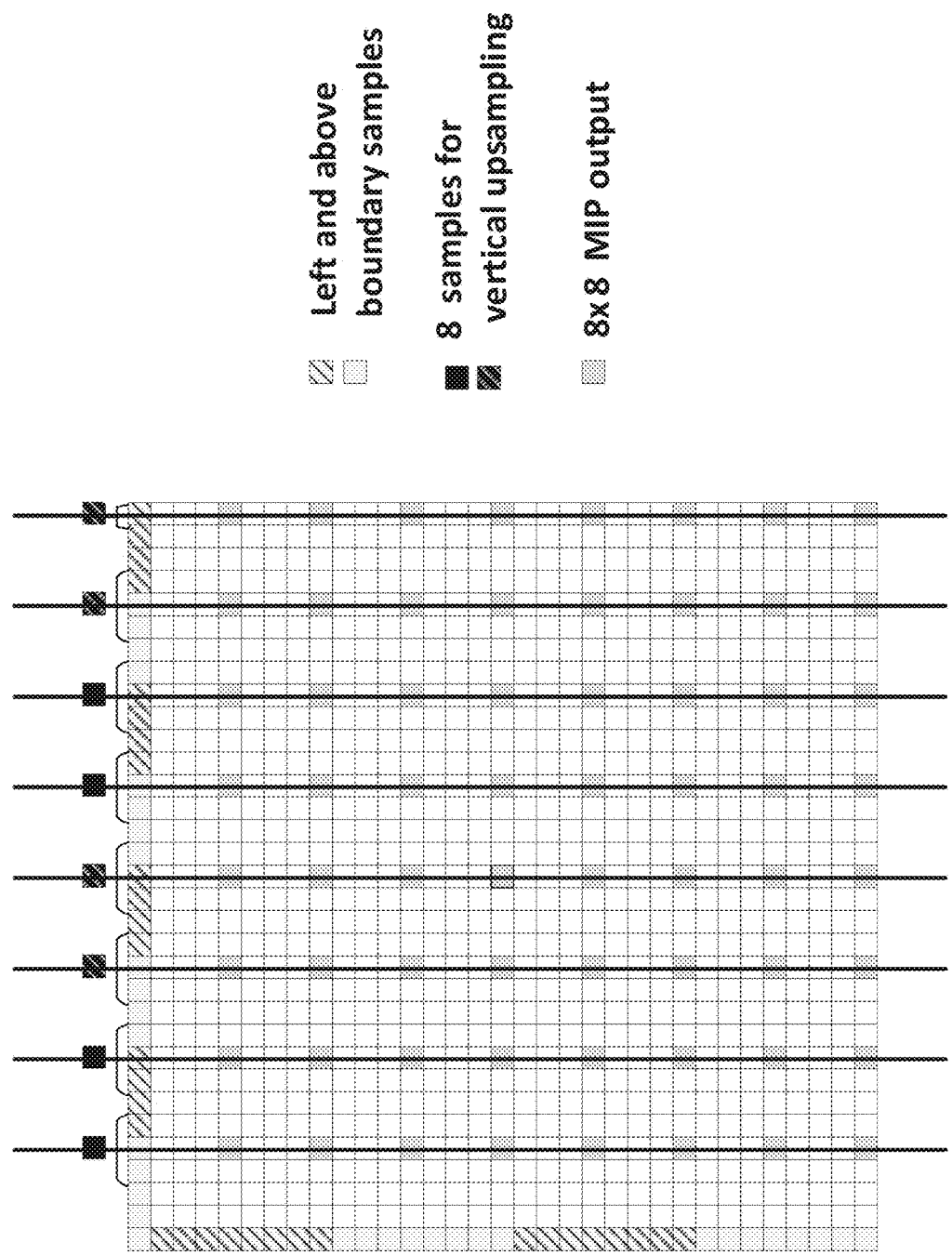
FIG. 21 illustrates downsampling filters aligned with the MMU output.

In another embodiment, shown in FIG. 21, an odd number of samples are used in the averaging in order to eliminate the misalignment between the center of the averaged samples and the MMU output samples. This embodiment uses a three tap filter (illustrated as a bracket) centered on the MMU output.

The current VVC draft text (ref JVET-N1001-v6) for the MIP boundary sample down-sampling process is as follows:
8.4.5.2.3 MIP Boundary Sample Downsampling Process
Inputs to this process are:
variable nTbS specifying the transform block size,
reference samples refS[x] with x=0 . . . nTbS−1,
a variable boundarySize specifying the downsampled boundary size,
a flag needUpsBdry specifying whether intermediate boundary samples are required for upsampling,
a variable upsBdrySize specifying the boundary size for upsampling.

Outputs of this process are the reduced boundary samples redS[x] with x=0 . . . boundarySize−1 and upsampling boundary samples upsBdryS[x] with x=0 . . . upsBdrySize−1.

The upsampling boundary samples upsBdryS[x] with x=0 . . . upsBdrySize−1 are derived as follows:
If needUpsBdry is equal to TRUE and upsBdrySize is less than nTbS, the following applies:

$$uDwn = nTbS/upsBdrySize \quad (8\text{-}74)$$

$$upsBdryS[x] = (\Sigma_{i=0}^{uDwn-1} refS[x*uDwn+i]+(1<<(Log\ 2(uDwn)-1)))>>Log\ 2(uDwn) \quad (8\text{-}75)$$

Otherwise (upsBdrySize is equal to nTbS), upsBdryS[x] is set equal to refS[x].

The reduced boundary samples redS[x] with x=0 . . . boundarySize−1 are derived as follows:
If boundarySize is less than upsBdrySize, the following applies:

$$bDwn = upsBdrySize/boundarySize \quad (8\text{-}76)$$

$$redS[x] = (\Sigma_{i=0}^{bDwn-1} upsBdryS[x*bDwn+i]+(1<<(Log\ 2(bDwn)-1)))>>Log\ 2(bDwn) \quad (8\text{-}77)$$

Otherwise (boundarySize is equal to upsBdrySize), redS[x] is set equal to upsBdryS[x].

The following modified text based on the current draft text implements an embodiment of the present disclosure. The deleted text is shown by strikethroughs and the added text is indicated by bold typeface.
8.4.5.2.3 MIP Boundary Sample Downsampling Process
Inputs to this process are:
a variable nTbS specifying the transform block size,
reference samples refS[x] with x=0 . . . nTbS−1,
a variable boundarySize specifying the downsampled boundary size,
a flag needUpsBdry specifying whether intermediate boundary samples are required for upsampling,
a variable upsBdrySize specifying the boundary size for upsampling.

Outputs of this process are the reduced boundary samples redS[x] with x=0 . . . boundarySize−1 and upsampling boundary samples upsBdryS[x] with x=0 . . . upsBdrySize−1.

The upsampling boundary samples upsBdryS[x] with x=0 . . . upsBdrySize−1 are derived as follows:
If needUpsBdry is equal to TRUE and upsBdrySize is less than nTbS, the following applies:

$$uDwn = nTbS/upsBdrySize \quad (8\text{-}74)$$

$$upsBdryS[x] = refS[x*uDwn+uDwn-1] \quad (8\text{-}75)$$

Otherwise (upsBdrySize is equal to nTbS), upsBdryS[x] is set equal to refS[x].

The reduced boundary samples redS[x] with x=0 . . . boundarySize−1 are derived as follows:
If boundarySize is less than nTbS, the following applies:

$$bDwn = nTbS/boundarySize \quad (8\text{-}76)$$

$$bDwnHalf = bDwn/2 \quad (8\text{-}77)$$

$$redS[x] = (refS[x*bDwn+bDwnHalf-1]+refS[x*bDwn+bDwn-1]+1)>>1 \quad (8\text{-}78)$$

Otherwise (boundarySize is equal to nTbS), redS[x] is set equal to refS[x].

Figure 22:
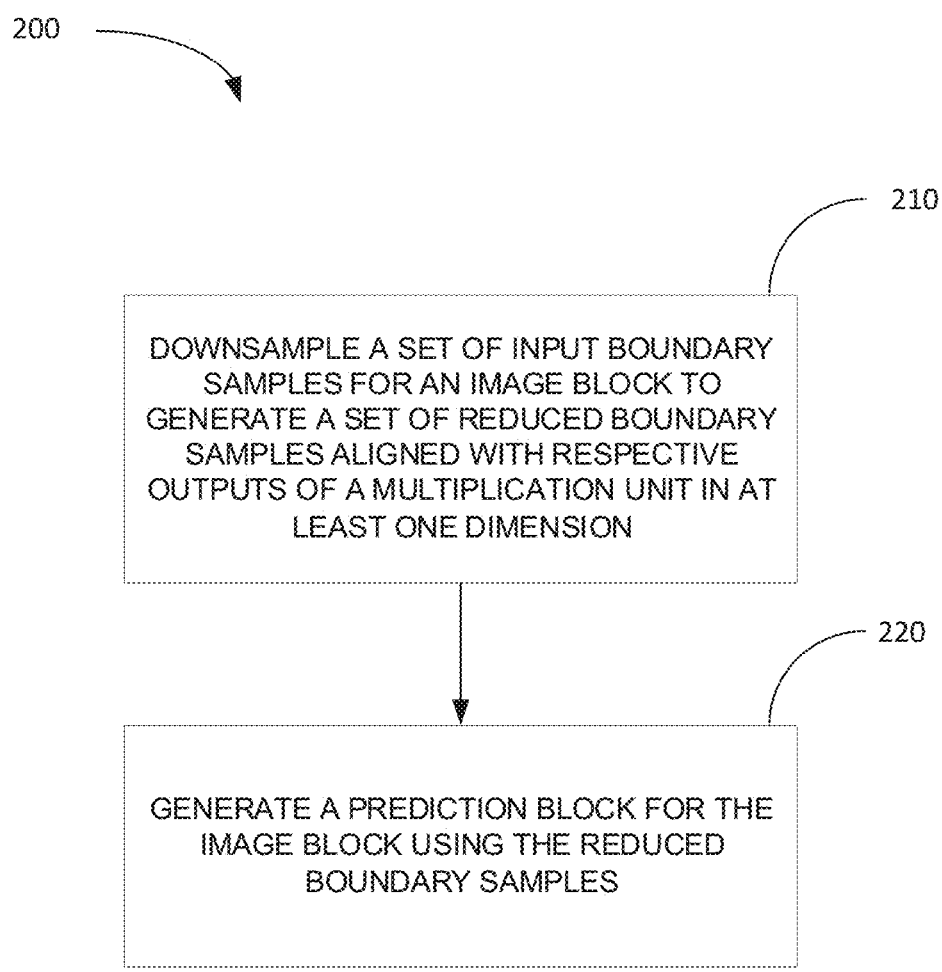
FIG. 22 illustrates an exemplary method of MIP according to one embodiment.

FIG. 22 illustrates an exemplary method 200 of MIP implemented by an encoder 24 or decoder 44. When MIP is applied to a current block, the encoder/decoder 24, 44 downsamples a set of input boundary samples for an image block to generate a set of reduced boundary samples aligned with respective outputs of a MMU in at least one direction (block 210). The encoder/decoder 24, 44 then generates a prediction block for the current block using the reduced boundary samples (block 220).

In some embodiments of the method 200, downsampling the set of input boundary samples for the current block comprises, for each of one or more of the reduced boundary samples in the set of reduced boundary samples, downsampling input boundary samples using a filter centered on a respective output of the multiplication unit 64 to obtain the reduced boundary sample.

In some embodiments of the method 200, downsampling the set of input boundary samples for the current block comprises, for each of one or more of the reduced boundary samples in the set of reduced boundary samples, averaging a plurality of input boundary samples centered on a respective output of the multiplication unit 64 to obtain the reduced boundary sample.

In some embodiments of the method 200, downsampling the set of input boundary samples for the current block comprises, for each of one or more of the reduced boundary samples in the set of reduced boundary samples, averaging N input boundary samples from every M input boundary samples to obtain the reduced boundary sample, where M>N>1 and M is a downsampling factor.

In some embodiments of the method 200, downsampling the set of input boundary samples for the current block comprises, for an end sample in the set of reduced boundary samples, selecting one of the input boundary samples from the set of input boundary samples aligned with an end output of the multiplication unit 64 in either a horizontal or vertical direction.

In some embodiments of the method 200, downsampling the set of input boundary samples for the current block comprises, for each of one or more reduced boundary samples in the set of reduced boundary samples, selecting one of the input boundary samples aligned with a respective one of the outputs of the multiplication unit 64 as the reduced boundary sample.

In some embodiments of the method 200, generating the prediction block for the current block using the reduced boundary samples comprises inputting the reduced boundary samples to the multiplication unit 64, and generating a reduced predication block comprising a reduced set of prediction samples by multiplication of the reduced boundary samples input to the multiplication unit 64.

In some embodiments of the method 200, generating the prediction block for the current block using the reduced boundary samples further comprises generating remaining samples of the prediction block by linear interpolation using the reduced set of prediction samples.

In some embodiments of the method 200, generating the prediction block for the current block using the reduced boundary samples further comprises generating a set of interpolation boundary samples, and generating one or more of the remaining predication samples by linear interpolation using one or more boundary samples in the set of interpolation boundary samples and the reduced set of prediction samples.

In some embodiments of the method 200, generating the set of interpolation boundary samples comprises downsampling the set of input boundary samples for the current block to obtain the set of interpolation boundary samples.

In some embodiments of the method 200, downsampling the set of input boundary samples for the current block to obtain the set of interpolation boundary samples comprises, for each of one or more boundary samples in the set of interpolation boundary samples, averaging an odd number of input boundary samples centered on a respective output of the multiplication unit 64 to obtain the boundary sample.

In some embodiments of the method 200, downsampling the set of input boundary samples for the current block to obtain the set of interpolation boundary samples comprises, for each of one or more boundary samples in the set of interpolation boundary samples, selecting one of the input boundary samples from the set of input boundary samples aligned with one of the outputs of the multiplication unit 64.

In some embodiments of the method 200, downsampling the set of input boundary samples for the current block in an image comprises reducing a number of boundary samples in the set of input boundary samples by a factor of 2N using a single-step derivation process to obtain the reduced set of boundary samples.

In some embodiments of the method 200, the single-step derivation process comprises, for each reduced boundary sample in the reduced set of reduced boundary samples adding the values of 2N boundary samples plus 2N−1 to obtain a sum, and right shifting the sum N places.

In some embodiments of the method 200, generating the prediction block for the current block using the reduced boundary samples comprises generating a reduced prediction block comprising a reduced set of prediction samples, and generating one or more remaining prediction samples of the prediction block by linear interpolation using respective ones of the boundary samples in the set of reduced boundary samples.

In some embodiments of the method 200, the reduced boundary samples comprise reduced top boundary samples aligned in a vertical direction with the outputs of the multiplication unit 64.

In some embodiments of the method 200, the reduced boundary samples comprise reduced left boundary samples aligned in a horizontal direction with the outputs of the multiplication unit 64.

Some embodiments of the method 200 further comprise generating a residual block by subtracting the prediction block from the current block and encoding the residual block for transmission to a destination device.

Some embodiments of the method 200 further comprise decoding an image signal to obtain a residual block for the current block and combining the prediction block with the residual block to generate the current block.

Figure 23:
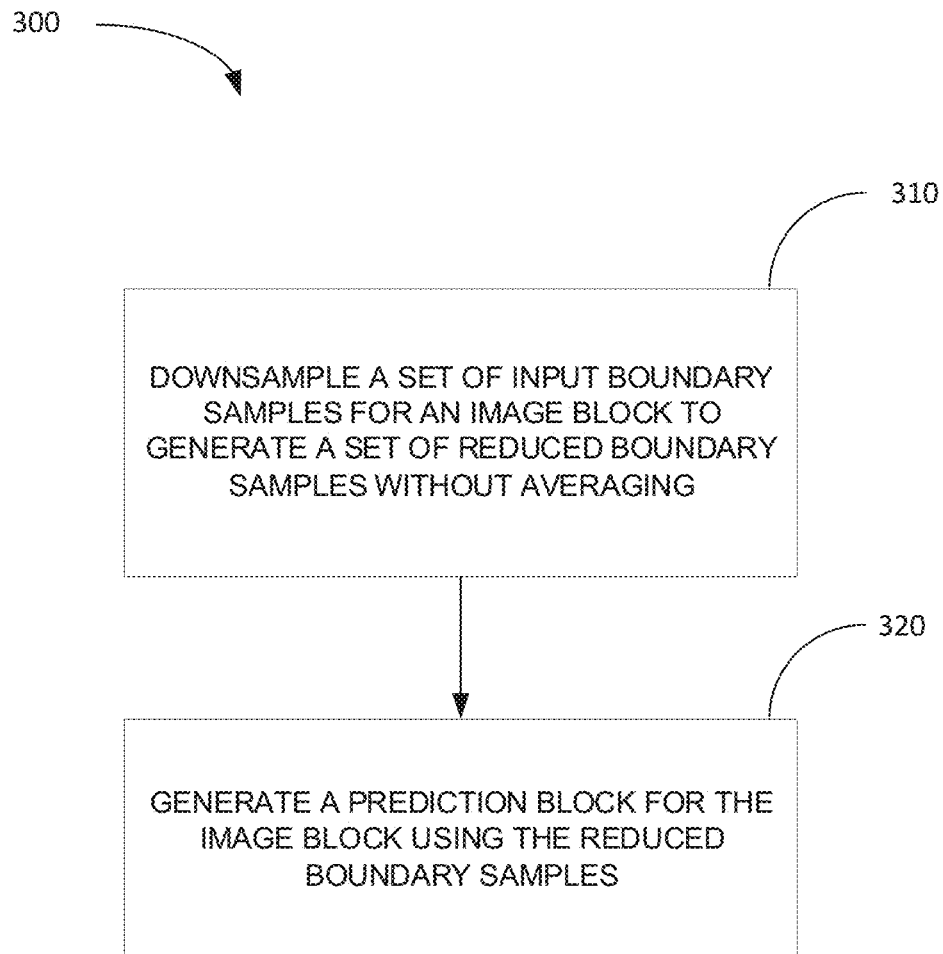
FIG. 23 illustrates another exemplary method of MIP according to one embodiment.

FIG. 23 illustrates an exemplary method 300 of MIP implemented by an encoder 24 or decoder 44. When MIP is applied to a current block, the encoder/decoder 24, 44 downsamples a set of input boundary samples for an image block to generate a set of reduced boundary samples without averaging (block 310). The encoder/decoder 24, 44 then generates a prediction block for the current block using the reduced boundary samples (block 320).

Some embodiments of the method 300 further comprise downsampling, without averaging, a set of input boundary samples for a current block in an image to generate a set of reduced boundary samples, and generating a prediction block for the current block using the reduced boundary samples.

In some embodiments of the method 300, downsampling the set of input boundary samples for the current block comprises, for each of one or more reduced boundary samples in the set of reduced boundary samples, selecting one of the input boundary samples aligned with a respective one of the outputs of the multiplication unit 64 as the reduced boundary sample.

In some embodiments of the method 300, generating the prediction block for the current block using the reduced boundary samples comprises inputting the reduced boundary samples to the multiplication unit 64, and generating a reduced predication block comprising a reduced set of prediction samples by multiplication of the reduced boundary samples input to the multiplication unit 64.

In some embodiments of the method 300, generating the prediction block for the current block using the reduced boundary samples further comprises generating remaining samples of the prediction block by linear interpolation using the reduced set of prediction samples.

In some embodiments of the method 300, generating the prediction block for the current block using the reduced boundary samples further comprises generating a set of interpolation boundary samples, and generating one or more of the remaining predication samples by linear interpolation using one or more boundary samples in the set of interpolation boundary samples and the reduced set of prediction samples In some embodiments of the method 300, generating the set of interpolation boundary samples comprises downsampling the set of input boundary samples for the current block to obtain the set of interpolation boundary samples.

In some embodiments of the method 300, downsampling the set of input boundary samples for the current block to obtain the set of interpolation boundary samples comprises, for each of one or more boundary samples in the set of interpolation boundary samples, selecting one of the input boundary samples from the set of input boundary samples aligned with one of the outputs of the multiplication unit 64.

In some embodiments of the method 300, downsampling the set of input boundary samples for the current block in an image comprises reducing a number of boundary samples in the set of input boundary samples by a factor of 2N using a single-step derivation process to obtain the reduced set of boundary samples.

In some embodiments of the method 300, the single-step derivation process comprises, for each reduced boundary sample in the reduced set of reduced boundary samples, adding the values of 2N boundary samples plus 2N−1 to obtain a sum, and right shifting the sum N places.

In some embodiments of the method 300, generating the prediction block for the current block using the reduced boundary samples comprises generating a reduced prediction block comprising a reduced set of prediction samples, and generating one or more remaining prediction samples of the prediction block by linear interpolation using respective ones of the boundary samples in the set of reduced boundary samples.

In some embodiments of the method 300, the reduced boundary samples comprise reduced top boundary samples aligned in a vertical direction with the outputs of the multiplication unit 64.

In some embodiments of the method 300, the reduced boundary samples comprise reduced left boundary samples aligned in a horizontal direction with the outputs of the multiplication unit 64.

Some embodiments of the method 300 further comprise generating a residual block by subtracting the prediction block from the current block and encoding the residual block for transmission to a destination device.

Some embodiments of the method 300 further comprise decoding an image signal to obtain a residual block for the current block and combining the prediction block with the residual block to generate the current block.

Figure 24:
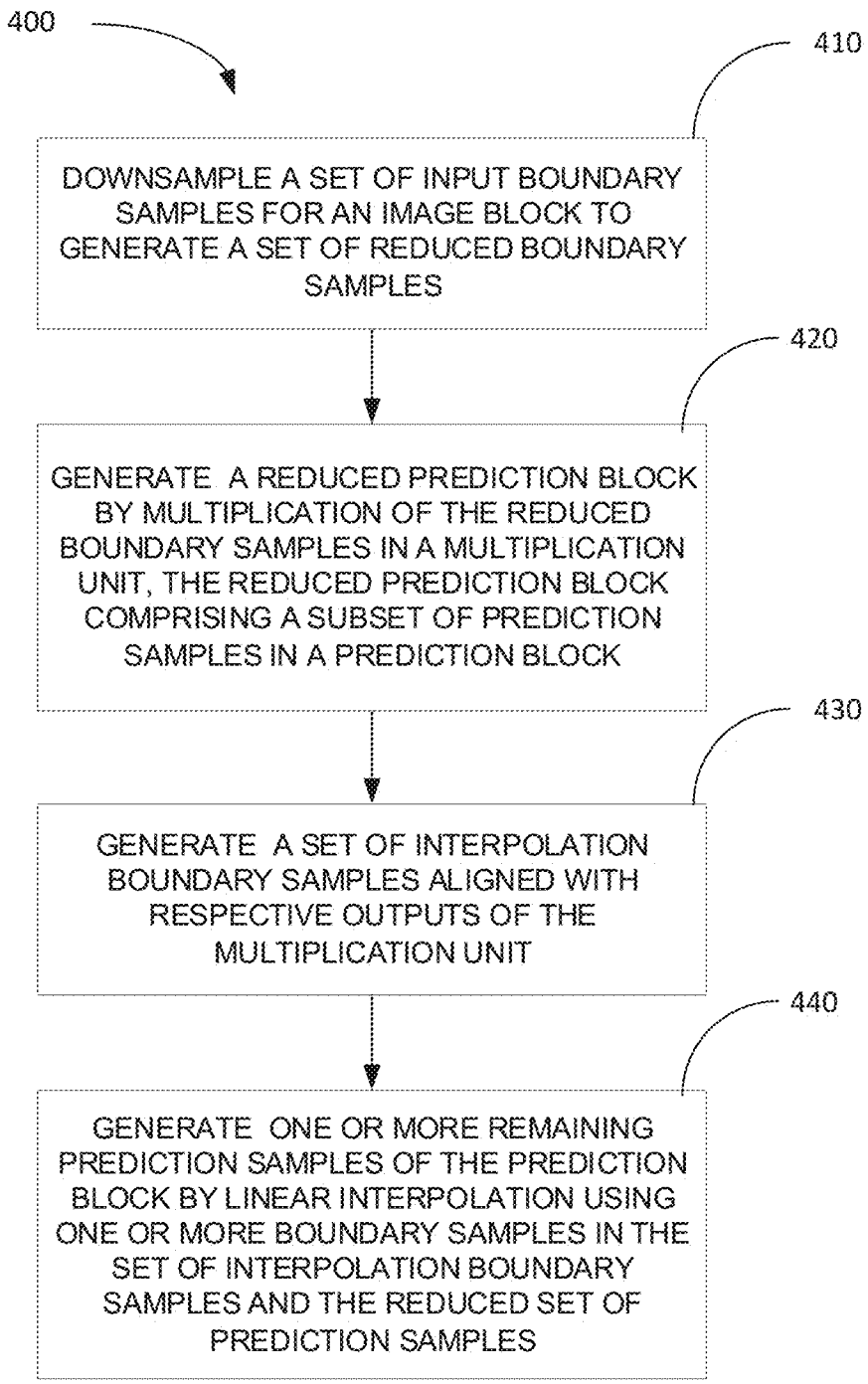
FIG. 24 illustrates another exemplary method of MIP according to one embodiment.

FIG. 24 illustrates an exemplary method 400 of MIP implemented by an encoder 24 or decoder 44. The encoder/decoder 24, 44 downsamples the set of input boundary samples to generate a set of reduced boundary samples (block 410) and generates a reduced prediction block by multiplication of the reduced boundary samples in a multiplication unit 64 (block 420). The reduced prediction block comprising a subset of prediction samples in a prediction block. The encoder/decoder 24, 44 further generates a set of interpolation boundary samples aligned with respective outputs of the multiplication unit 64 (block 430) and generates one or more remaining prediction samples of the prediction block by linear interpolation using one or more boundary samples in the set of interpolation boundary samples and the reduced set of prediction samples (block 440).

In some embodiments of the method 400, downsampling the set of input boundary samples for the current block comprises, for each of one or more of the reduced boundary samples in the set of reduced boundary samples, downsampling input boundary samples using a filter centered on a respective output of the multiplication unit 64 to obtain the reduced boundary sample.

In some embodiments of the method 400, downsampling the set of input boundary samples for the current block comprises, for each of one or more of the reduced boundary samples in the set of reduced boundary samples, averaging a plurality of input boundary samples centered on a respective output of the multiplication unit 64 to obtain the reduced boundary sample.

In some embodiments of the method 400, downsampling the set of input boundary samples for the current block comprises, for each of one or more of the reduced boundary samples in the set of reduced boundary samples, averaging N input boundary samples from every M input boundary samples to obtain the reduced boundary sample, where M>N>1 and M is a downsampling factor.

In some embodiments of the method 400, downsampling the set of input boundary samples for the current block comprises, for an end sample in the set of reduced boundary samples, selecting one of the input boundary samples from the set of input boundary samples aligned with an end output of the multiplication unit 64 in either a horizontal or vertical direction.

In some embodiments of the method 400, downsampling the set of input boundary samples for the current block comprises, for each of one or more reduced boundary samples in the set of reduced boundary samples, selecting one of the input boundary samples aligned with a respective one of the outputs of the multiplication unit 64 as the reduced boundary sample.

In some embodiments of the method 400, generating the set of interpolation boundary samples comprises downsampling the set of input boundary samples for the current block to obtain the set of interpolation boundary samples.

In some embodiments of the method 400, downsampling the set of input boundary samples for the current block to obtain the set of interpolation boundary samples comprises, for each of one or more boundary samples in the set of interpolation boundary samples, averaging an odd number of input boundary samples centered on a respective output of the multiplication unit 64 to obtain the boundary sample.

In some embodiments of the method 400, downsampling the set of input boundary samples for the current block to obtain the set of interpolation boundary samples comprises, for each of one or more boundary samples in the set of interpolation boundary samples, selecting one of the input boundary samples from the set of input boundary samples aligned with one of the outputs of the multiplication unit 64.

In some embodiments of the method 400, downsampling the set of input boundary samples for the current block in an image comprises reducing a number of boundary samples in the set of input boundary samples by a factor of 2N using a single-step derivation process to obtain the reduced set of boundary samples.

In some embodiments of the method 400, the single-step derivation process comprises, for each reduced boundary sample in the set of reduced boundary samples, adding the values of 2N boundary samples plus 2N−1 to obtain a sum and right shifting the sum N places.

Some embodiments of the method 400 further comprise generating a residual block by subtracting the prediction block from the current block; and encoding the residual block for transmission to a destination device.

In some embodiments of the method 400, the interpolation boundary samples comprise reduced top boundary samples aligned in a vertical direction with the outputs of the multiplication unit 64.

In some embodiments of the method 400, the interpolation boundary samples comprise reduced left boundary samples aligned in a horizontal direction with the outputs of the multiplication unit 64.

Some embodiments of the method 400 further decoding an image signal to obtain a residual block for the current block and combining the prediction block with the residual block to generate the current block.

Figure 25:
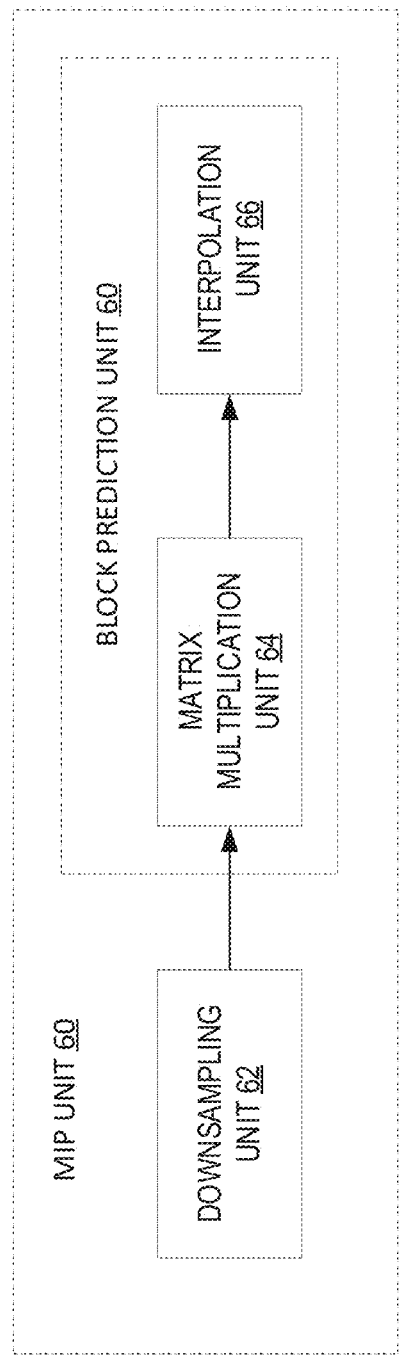
FIG. 25 illustrates an exemplary prediction unit for MIP.

FIG. 25 illustrates an exemplary MIP unit 60, which can be used as the prediction unit 28, 54 in the encoder 24 or decoder 44 respectively. The MIP unit 60 comprises a downsampling unit 62, MMU 64, and interpolation unit 66. The MMU 64, and interpolation unit 66 are referred to herein collectively as the block prediction unit 68. The downsampling unit 62 is configured to downsample the input boundary samples to derive the reduced boundary samples used for matrix multiplication, linear interpolation or both. In one embodiment, the downsampling is performed so that the derived boundary samples are aligned with an output of the MMU 64 in at least one direction. In another embodiment, the downsampling for matrix multiplication, linear interpolation or both or both is performed without averaging. The MMU 64 is configured to multiply the reduced boundary $bdry_{red}$ by matrix vectors to derive a prediction block pred or reduced prediction block $pred_{red}$. In cases where the output of the MMU 64 comprises a reduced prediction block $pred_{red}$, the interpolation unit 666 is configured to perform linear interpolation to derive the reaming prediction samples in pred.

Figure 26:
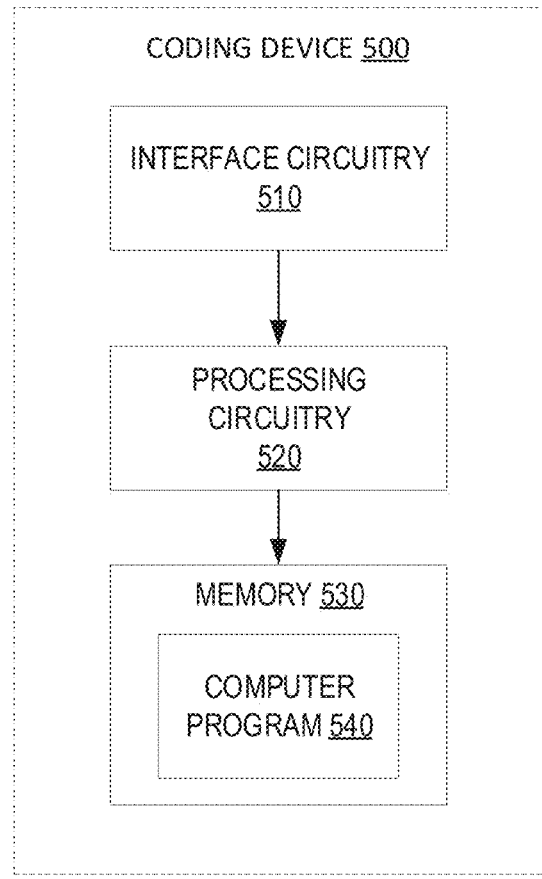
FIG. 26 illustrates an encoding or decoding device configured to perform MIP as herein described.

FIG. 26 illustrates a coding device 500 configured to perform encoding, decoding, or both as herein described. The coding device 500 comprises interface circuitry 510, processing circuitry 520 and memory 530. The interface circuitry 510 enables the input and/or output of video signals and image signals. The input signals may comprise coded or unencoded video signals or image signals. The output signals, similarly, may comprise unencoded or coded video signals or image signals. The processing circuitry 520 may comprise one or more microprocessors, hardware, firmware, or a combination thereof configured to perform video coding and/or decoding using MIP as herein described to produce the output signals from the input signals.

In an exemplary embodiment, the processing circuitry 530 is configured to downsample a set of input boundary samples to generate a set of reduced boundary samples and to generate a reduced prediction block by multiplication of the reduced boundary samples in a multiplication unit. The reduced prediction block comprises a subset of prediction samples in a prediction block. The processing circuitry 530 is further configured to generate a set of interpolation boundary samples aligned with respective outputs of the multiplication unit. The processing circuitry 530 is further configured to generate one or more remaining prediction samples of the prediction block by linear interpolation using one or more boundary samples in the set of interpolation boundary samples and the reduced set of prediction samples.

Memory 530 comprises both volatile and non-volatile memory for storing computer program code and data needed by the processing circuitry 530 for operation. Memory 530 may comprise any tangible, non-transitory computer-readable storage medium for storing data including electronic, magnetic, optical, electromagnetic, or semiconductor data storage. Memory 530 stores a computer program 540 comprising executable instructions that configure the processing circuitry 530 to implement the methods 100-400 as herein described. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 540 for configuring the processing circuitry 530 as herein described may be stored in a removable memory, such as a portable compact disc, portable digital video disc, or other removable media. The computer program 540 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

In an exemplary embodiment, the computer program comprises executable instructions that, when executed by processing circuitry in an encoder/decoder 24, 44 causes the encoder/decoder 24, 44 to downsample a set of input boundary samples to generate a set of reduced boundary samples and generating a reduced prediction block by multiplication of the reduced boundary samples in a multiplication unit. The reduced prediction block comprises a subset of prediction samples in a prediction block. The instructions further cause the encoder/decoder 24, 44 to generate a set of interpolation boundary samples aligned with respective outputs of the multiplication unit. The instructions further cause the encoder/decoder 24, 44 to generate one or more remaining prediction samples of the prediction block by linear interpolation using one or more boundary samples in the set of interpolation boundary samples and the reduced set of prediction samples.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present disclosure provide techniques for reducing the computational complexity and latency of MIP without sacrificing coding efficiency. The techniques as herein described have negligible impact on coding performance compared to prior art techniques. The embodiments also reduce misalignment between boundary samples and the MMU output when MIP is used.

What is claimed is:
1. A method of intra block prediction, the method comprising:
    downsampling a set of input boundary samples for a current block in an image to generate a set of reduced boundary samples;
    generating a reduced prediction block based upon matrix multiplication of the set of reduced boundary samples, the reduced prediction block comprising a subset of prediction samples in a prediction block;
    generating at least one interpolation boundary samples aligned with a respective outputs sample of the matrix multiplication by downsampling the set of input boundary samples for the current block to obtain a set of interpolation boundary samples and, for each of one or more boundary samples in the set of interpolation boundary samples, either
  selecting one of the input boundary samples from the set of input boundary samples aligned with one of the outputs of the matrix multiplication, or
  averaging an odd number of input boundary samples centered on a respective output of the matrix multiplication, to obtain the boundary sample;
generating at least one or more remaining prediction samples of the prediction block by linear interpolation using the at least one interpolation boundary samples and one samples of the reduced prediction block; and
outputting the prediction block corresponding to the current block, the prediction block comprising the subset of prediction samples in the reduced prediction block and the at least one remaining prediction samples.

2. The method of claim 1, wherein the downsampling the set of input boundary samples for the current block comprises, for each of one or more of the reduced boundary samples in the set of reduced boundary samples:
  downsampling input boundary samples using a filter centered on a respective output of the matrix multiplication to obtain the reduced boundary sample; or
  averaging a plurality of input boundary samples centered on a respective output of the matrix multiplication to obtain the reduced boundary sample; or
  averaging N input boundary samples from every M input boundary samples to obtain the reduced boundary sample, where M>N>1 and M is a downsampling factor; or
  selecting one of the input boundary samples aligned with a respective one of the outputs of the matrix multiplication as the reduced boundary sample.

3. The method of claim 1, wherein the downsampling the set of input boundary samples for the current block comprises, for an end sample in the set of reduced boundary samples, selecting one of the input boundary samples from the set of input boundary samples aligned with an end output of the matrix multiplication in either a horizontal or vertical direction.

4. The method of claim 1, wherein the downsampling the set of input boundary samples for the current block in an image comprises reducing a number of boundary samples in the set of input boundary samples by a factor of 2N using a single-step derivation process to obtain the set of reduced boundary samples.

5. The method of claim 4, wherein the single-step derivation process comprises, for each reduced boundary sample in the set of reduced boundary samples:
  adding the values of 2N boundary samples plus 2N−1 to obtain a sum; and
  right shifting the sum N places.

6. The method of claim 1, further comprising:
  generating a residual block by subtracting the prediction block from the current block; and
  encoding the residual block for transmission to a destination device.

7. The method of claim 1, wherein the interpolation boundary samples comprise either:
  reduced top boundary samples aligned in a vertical direction with the outputs of the matrix multiplication; or
  reduced left boundary samples aligned in a horizontal direction with the outputs of the matrix multiplication.

8. The method of claim 1, further comprising:
  decoding an image signal to obtain a residual block for the current block; and
  combining the prediction block with the residual block to generate the current block.

9. A device for encoding and/or decoding images, the device comprising:
  processing circuitry;
  memory containing instructions executable by the processing circuitry whereby the device is operative to perform matrix based intra prediction for blocks in an image by:
    downsampling a set of input boundary samples for a current block in the image to generate a set of reduced boundary samples;
    generating a reduced prediction block based upon matrix multiplication of the set of reduced boundary samples, the reduced prediction block comprising a subset of prediction samples in a prediction block;
    generating at least one interpolation boundary sample aligned with a respective output sample of the matrix multiplication by downsampling the set of input boundary samples for the current block to obtain a set of interpolation boundary samples and, for each of one or more boundary samples in the set of interpolation boundary samples, either
      selecting one of the input boundary samples from the set of input boundary samples aligned with one of the outputs of the matrix multiplication, or
      averaging an odd number of input boundary samples centered on a respective output of the matrix multiplication, to obtain the boundary sample;
    generating at least one remaining prediction sample of the prediction block by linear interpolation using the at least one interpolation boundary sample and one sample of the reduced prediction block; and
    outputting the prediction block corresponding to the current block, the prediction block comprising the subset of prediction samples in the reduced prediction block and the at least one remaining prediction sample.

10. The device of claim 9, wherein the instructions are such that the device is operative to perform the downsampling of the set of input boundary samples for the current block by, for each of one or more of the reduced boundary samples in the set of reduced boundary samples, obtaining the reduced boundary sample by:
  downsampling input boundary samples using a filter centered on a respective output of the matrix multiplication; or
  averaging a plurality of input boundary samples centered on a respective output of the matrix multiplication; or
  averaging N input boundary samples from every M input boundary samples, where M>N>1 and M is a downsampling factor; or
  selecting one of the input boundary samples aligned with a respective one of the outputs of the matrix multiplication.

11. The device of claim 9, wherein the instructions are such that the device is operative to perform the downsampling of the set of input boundary samples for the current block by, for an end sample in the set of reduced boundary samples, selecting one of the input boundary samples from the set of input boundary samples aligned with an end output of the matrix multiplication in either a horizontal or vertical direction.

12. The device of claim 9, wherein the instructions are such that the device is operative to perform the downsampling of the set of input boundary samples for the current block in an image by reducing a number of boundary samples in the set of input boundary samples by a factor of 2N using a single-step derivation process to obtain the set of reduced boundary samples.

13. The device of claim 12, wherein the instructions are such that the device is operative to perform the single-step derivation process by, for each reduced boundary sample in the set of reduced boundary samples:
    adding the values of 2N boundary samples plus 2N−1 to obtain a sum; and
    right shifting the sum N places.

14. The device of claim 9, wherein the instructions are such that the device is operative to:
    generate a residual block by subtracting the prediction block from the current block; and
    encode the residual block for transmission to a destination device.

15. The device of claim 9, wherein the at least one interpolation boundary sample comprises either:
    a reduced top boundary sample aligned in a vertical direction with one of the outputs of the matrix multiplication; or
    a reduced left boundary sample aligned in a horizontal direction with one of the outputs of the matrix multiplication.

16. The device of claim 9, wherein the instructions are such that the device is operative to:
    decode an image signal to obtain a residual block for the current block; and
    combine the prediction block with the residual block to generate the current block.

17. The device of claim 9, wherein the device is a source or destination device.

18. A non-transitory computer readable recording medium storing a computer program product for matrix based intra prediction for blocks of an image, the computer program product comprising program instructions which, when run on processing circuitry of a device, causes the device to:
    downsample a set of input boundary samples for a current block in the image to generate a set of reduced boundary samples;
    generate a reduced prediction block based upon matrix multiplication of the set of reduced boundary samples, the reduced prediction block comprising a subset of prediction samples in a prediction block;
    generate at least one interpolation boundary sample aligned with a respective output sample of the matrix multiplication by downsampling the set of input boundary samples for the current block to obtain a set of interpolation boundary samples and, for each of one or more boundary samples in the set of interpolation boundary samples, either
        selecting one of the input boundary samples from the set of input boundary samples aligned with one of the outputs of the matrix multiplication, or
        averaging an odd number of input boundary samples centered on a respective output of the matrix multiplication, to obtain the boundary sample;
    generate at least one remaining prediction sample of the prediction block by linear interpolation using the at least one interpolation boundary sample and one sample of the reduced prediction block; and
    output the prediction block corresponding to the current block, the prediction block comprising the subset of prediction samples in the reduced prediction block and the at least one remaining prediction sample.

* * * * *